US010992793B1

(12) United States Patent
Medley et al.

(10) Patent No.: US 10,992,793 B1
(45) Date of Patent: Apr. 27, 2021

(54) TELEPHONE SYSTEM FOR THE HEARING IMPAIRED

(71) Applicant: Eugenious Enterprises, LLC, Medina, OH (US)

(72) Inventors: Michael J. Medley, Medina, OH (US); Matthew G. Good, Eldersburg, MD (US)

(73) Assignee: Eugenious Enterprises, LLC, Medina, OH (US)

( * ) Notice: Subject to any disclaimer, the term of this patent is extended or adjusted under 35 U.S.C. 154(b) by 0 days.

(21) Appl. No.: 16/812,293

(22) Filed: Mar. 7, 2020

(51) Int. Cl.
*H04M 11/00* (2006.01)
*H04M 3/42* (2006.01)
*H04M 1/247* (2021.01)
*G10L 21/10* (2013.01)
*H04M 1/57* (2006.01)
*G10L 17/00* (2013.01)
*G10L 21/06* (2013.01)

(52) U.S. Cl.
CPC ........... *H04M 1/2475* (2013.01); *G10L 17/00* (2013.01); *G10L 21/10* (2013.01); *H04M 1/576* (2013.01); *H04M 3/42391* (2013.01); *G10L 2021/065* (2013.01)

(58) Field of Classification Search
None
See application file for complete search history.

(56) References Cited

U.S. PATENT DOCUMENTS

| 9,628,620 | B1 | 4/2017 | Rae et al. | |
|---|---|---|---|---|
| 10,038,783 | B2 * | 7/2018 | Wilcox | G09B 21/009 |
| 10,122,968 | B1 | 11/2018 | Talbot | |
| 10,192,554 | B1 | 1/2019 | Boehme et al. | |
| 2002/0069069 | A1 * | 6/2002 | Kanevsky | G10L 15/26 704/271 |
| 2002/0161578 | A1 * | 10/2002 | Saindon | G10L 15/26 704/235 |
| 2014/0018045 | A1 * | 1/2014 | Tucker | H04W 4/12 455/413 |
| 2014/0314220 | A1 * | 10/2014 | Charugundla | H04M 7/1295 379/88.14 |
| 2017/0206888 | A1 * | 7/2017 | Engelke | G10L 21/10 |

(Continued)

OTHER PUBLICATIONS

"Captioned Telephone Service (CTS)", Retrieved from: <<https://www.nad.org/resources/technology/telephone-and-relay-services/captioned-telephone-service-cts/>>, Retrieved Date: Mar. 6, 2020, 2 Pages.

(Continued)

*Primary Examiner* — Quoc D Tran

(74) *Attorney, Agent, or Firm* — Medley, Behrens & Lewis, LLC

(57) ABSTRACT

A telephone system is described herein, wherein the telephone system is configured to assist a hearing-impaired person with telephone communications as well as face-to-face conversations. In telephone communication sessions, the telephone system is configured to audibly emit spoken utterances while simultaneously depicting a transcription of the spoken utterances on a display. When the telephone system is not employed in a telephone communication session, the telephone system is configured to display transcriptions of spoken utterances of people who are in proximity to the telephone system.

20 Claims, 12 Drawing Sheets

(56) References Cited

U.S. PATENT DOCUMENTS

2019/0378533 A1* 12/2019 Chao ..................... G10L 17/02

OTHER PUBLICATIONS

"Harris Communications", Retrieved from: <<https://www.harriscomm.com/captel-2400i-captioned-phone.html>>, Retrieved Date: Mar. 6, 2020, 4 Pages.

"Internet Protocol (IP) Captioned Telephone Service", Retrieved from: <<https://www.fcc.gov/consumers/guides/internet-protocol-ip-captioned-telephone-service>> Retrieved Date: Mar. 6, 2020, 2 Pages.

* cited by examiner

US 10,992,793 B1

TELEPHONE SYSTEM FOR THE HEARING IMPAIRED

BACKGROUND

Hearing loss affects approximately ⅓ of people between the ages of 61 and 70, and affects approximately ⅘ of people over the age of 85. Hearing aids are often used by people with hearing loss; hearing aids, generally, are configured to amplify audio that is detected by the hearing aids. As hearing loss continues for people as they age, hearing aids become less effective.

Accordingly, as a person ages and continues to experience hearing loss, an ability of the person to communicate audibly with other people is deleteriously impacted. For example, a person with a hearing impairment is unable to effectively use a conventional telephone system, as the person (regardless of whether or not the person is using hearing aids) is unable to hear the voice of a second person with whom the person is attempting to communicate via the telephone system.

Captioned telephones have been developed to assist people with hearing loss when using a telephone (these telephones are sometimes referred to as "captel phones"). Captioned telephones are provided to people who have been certified by a hearing expert as experiencing hearing loss, wherein in the United States a federally-funded captioning service is employed to provide captions to a user of a captioned telephone. In more detail, when a person using a captioned telephone places or receives a call, the captioned telephone establishes a three-way communication session between the captioned telephone, a telephone used by a contact of the person, and a telephone system used by an operator associated with the captioning service. The operator associated with the captioning service then causes a transcription of a conversation between the person and the contact of the person to be transmitted to the captioned telephone, whereupon the captioned telephone displays the transcription on a display.

There are several deficiencies associated with conventional captioned telephone systems. For example, to obtain a captioned telephone, a person must meet with a hearing specialist and register with the federally-funded captioning service. In addition, when a captioned telephone is employed, a human operator listens to conversations undertaken between the person using the captioned telephone and contacts of the person, which may feel invasive to the people in the conversation. Still further, there is delay associated with captioned telephones; the user of the captioned telephone may hear audio well before a transcription of the audio is presented, potentially leading to confusion. Finally, captioned telephones are limited to assisting people with hearing loss only when those people are using a telephone.

SUMMARY

The following is a brief summary of subject matter that is described in greater detail herein. This summary is not intended to be limiting as to the scope of the claims.

Described herein are various technologies pertaining to systems and methodologies for assisting people with hearing impairments. An exemplary telephone system is configured to present, to a first person using the telephone system and on a display of the telephone system, a transcription of spoken utterances of a second person with whom the first person is conversing by way of the telephone system, wherein words in the spoken utterances are presented on the display simultaneously with the words being audibly presented to the first person. Hence, words are presented on the display to the first person as the words are audibly presented to the first person by way of a speaker. In an exemplary embodiment, when a real-time communication session (e.g., a voice call) is established between the telephone system operated by the first person and a second telephone system operated by the second person, the telephone system can establish a connection to a server computing system that executes an automated speech recognition (ASR) system. Upon the telephone system receiving a voice signal that includes a spoken utterance of the second person operating the second telephone system, the telephone system can buffer the voice signal and additionally transmit the voice signal to the server computing system.

The server computing system, upon receiving the voice signal, generates a transcription of spoken utterances represented in the voice signal and transmits the transcription to the telephone system. The telephone system, responsive to receiving the transcription, displays words in the transcription on the display, retrieves the voice signal from the buffer, and causes the spoken utterances represented in the voice signal to be audibly output by a speaker of the telephone system. The telephone system described above addresses deficiencies of captioned telephones, as there is not a human operator listening to conversations held between the first person and the second person, and further as spoken utterances are simultaneously audibly output and visually presented to the first person (thereby assisting the first person with communicating in real-time with the second person).

In addition, the telephone system can be configured to present transcriptions of spoken utterances when the telephone system is not being employed in a real-time communication session with another telephone system. For example, the telephone system can include a microphone that generates an audio signal based upon captured audio in an environment of the telephone system, wherein such audio may include spoken utterances set forth by people who are in proximity to the telephone system (e.g., within fifteen feet of the telephone system). The telephone system can filter the voice of the first person from the audio signal and can transmit the filtered audio signal to the server computing system. The ASR system can generate a transcription of spoken utterances represented in the filtered audio signal. The server computing system transmits the transcription to the telephone system, which displays the transcription on the display. Thus, the telephone system displays transcriptions of spoken utterances emitted by people with whom the first person is conversing, thereby assisting the first person with participating in face-to-face conversations. Various embodiments relating to such telephone system are described in greater detail herein.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
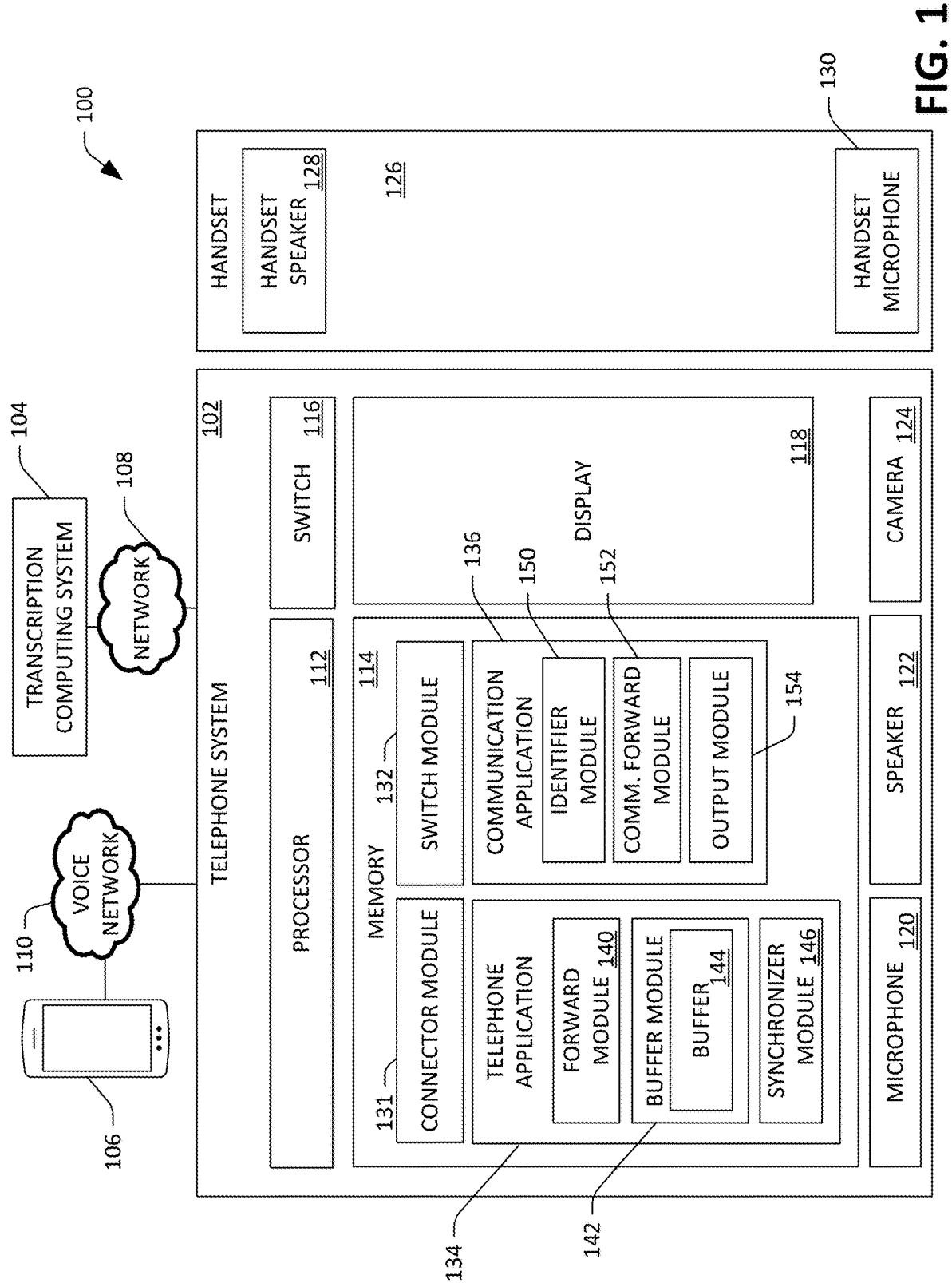
FIG. 1 is a functional block diagram of an exemplary system that is configured to assist people with hearing impairments participate in telephone and face-to-face conversations.

Various technologies pertaining to a telephone system that is configured to assist people with hearing impairments with participating in both telephone and in-person conversations are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices. Further, as used herein, the term "exemplary" is intended to mean serving as an illustration or example of something, and is not intended to indicate a preference.

Described herein are various technologies relating to a telephone system that is configured for people with hearing impairments. The telephone system includes or is in communication with a display, wherein the display presents transcriptions of spoken utterances to a user of the telephone system. Thus, when a first person has a hearing impairment and is participating in a real-time telephonic communication session with a second person, spoken utterances emitted by the second person are detected by a microphone (e.g., of a handset employed by the second person), and audio is emitted by a speaker (e.g., of a handset employed by the first person) such that the user is audibly provided with the spoken utterance. In addition, a display of the telephone system displays a transcription of the spoken utterance. As will be described in detail herein, a voice signal that represents the spoken utterance can be buffered until the transcription is displayed, such that the transcription is displayed on the display to the first person concurrently with the spoken utterance being audibly output by the speaker to the first person. This is in contrast to conventional captioned telephones, where there is a delay between a first time when the spoken utterance is emitted from a speaker and a second time when a transcription of the spoken utterance is presented on the display. This delay can impact comprehension of the spoken utterance (and thus comprehension of a relatively large portion of a conversation) from the perspective of the first person, who has the hearing impairment.

In addition, the telephone system described herein is not limited to telephone communications; rather, the telephone system described herein can assist the first person with participating in face-to-face conversations. For example, the first person may reside in an assisted living facility, and the hearing impairment will affect all audible communications (not just those undertaken by way of the telephone system). When the telephone system is not being employed in a real-time telephone communication session, a microphone of the telephone system can capture audio of the environment of the telephone system, wherein the audio includes a spoken utterance set forth by a second person who is in such environment. The telephone system can present a transcription of the spoken utterance set forth by the second person on the display of the telephone system (while refraining from presenting transcriptions of spoken utterances audibly emitted by the first person). Hence, the telephone system can provide a transcription of spoken utterances in a face-to-face communication session, thereby assisting the first person with comprehension of spoken utterances set forth by people with whom the first person is conversing.

With reference now to FIG. 1, a functional block diagram of an exemplary system 100 that is configured to assist a person who has a hearing impairment participate in real-time audible conversations (telephone conversations, video conference conversations, and face-to-face conversations) is illustrated. The system 100 includes a telephone system 102, a transcription computing system 104, and, for example, a mobile telephone 106, wherein the telephone system 102 is in communication with the transcription computing system 104 by way of a network 108 (such as the Internet), and further wherein the telephone system 102 is in communication with the mobile telephone 106 by way of a voice network 110.

The telephone system 102 includes a processor 112 and memory 114, wherein the memory 114 includes instructions that are executed by the processor 112. The telephone system 102 additionally comprises a switch 116 that is operably coupled to the processor 112, wherein the switch 116 is configured to output a signal that is indicative of whether the telephone system 102 is (at a current instance in time) employed in a telephone conversation. The telephone system 102 also comprises a display 118 that is operably coupled to the processor 112 such that the processor 112 can cause graphics to be presented on the display 118.

The telephone system 102 additionally comprises a microphone 120 that is configured to generate an audio signal that is processed by the processor 112, wherein the audio signal generated by the microphone 120 represents audio in the environment of the telephone system 102 that is detected by the microphone 120. The telephone system 102 can also optionally include a speaker 122 that is configured to emit audio into the environment of the telephone system 102, wherein the processor 112 can control the speaker 122 to emit such audio. Still further, the telephone system 102 can optionally include a camera 124 that is configured to generate images (e.g., optionally at a video frame rate) of surroundings of the telephone system 102.

The telephone system 102 additionally includes or has coupled thereto a handset 126, wherein the handset 126, when employed by a first person who is using the telephone system 102, is configured to be placed on or proximate the face of the first person. The handset 126 can be wirelessly coupled to the telephone system 102 or coupled to the telephone system 102 by way of a wire. The telephone system 102, while not shown in FIG. 1, may also include a cradle, wherein the handset 126 can be placed on the cradle when the first person is not employing the telephone system 102 in a real-time telephone conversation. The handset 126 includes a handset speaker 128 that is configured to output audio, wherein the output audio is based upon a voice signal received by the telephone system 102. When the handset 126 is placed on or proximate the face of the first person, the speaker 128 is proximate the ear of the first person. The handset 126 also comprises a handset microphone 130, wherein when the handset 126 is placed on or proximate the face of the first person who is using the telephone system 102, the handset microphone 130 is positioned to detect spoken utterances audibly output by the first person. The handset microphone 130 generates a voice signal that represents the spoken utterances audibly emitted by the first person, and the voice signal is transmitted by the telephone system 102 to the mobile telephone 106 by way of the voice network 110 (whereupon the spoken utterances can be audibly output by a speaker of the mobile telephone 106 based upon the voice signal).

The memory 114 of the telephone system 102, as mentioned previously, includes instructions that are executed by the processor 112. The memory 114 includes a connector module 131, a switch module 132, a telephone application 134, and a communication application 136. The connector module 131 is configured to establish and maintain a connection with the transcription computing system 104 by way of the network 108. For instance, the connector module 131 can establish the connection immediately upon the telephone system being powered on and can maintain such connection while the telephone system 102 remains powered. The connector module 131 can perform any suitable functionality, including handshaking, authentication, etc. in connection with establishing and maintaining the connection between the telephone system 102 and the transcription computing system 104 by way of the network 108. When the connection is established between the telephone system 102 and the transcription computing system 104, the telephone system can transmit voice data (in real-time) to the transcription computing system 104 by way of the network 108, and the transcription computing system 104 can transmit transcriptions of spoken utterances to the telephone system 102 by way of the network 108.

The switch module 132 is configured to receive output of the switch 116 and select one of the telephone application 134 or the communication application 136 based upon output of the switch 116. For instance, when output of the switch 116 indicates that the telephone system 102 is being employed in a real-time telephonic communications session, the switch module 132 selects the telephone application 134 (such that the processor 112 executes the telephone application 134). In contrast, when output of the switch 116 indicates that the telephone system 102 is not being employed in a real-time telephonic communications session, the switch module 132 selects the communication application 136 (such that the processor 112 executes the communication application 136).

The telephone application 134 also includes a forward module 140 that is configured to forward a voice signal (received from the mobile telephone 106 by way of the voice network 110) to the transcription computing system 104 by way of the network 108. More specifically, the telephone system 102 is operated by a first person and the mobile telephone 106 is operated by a second person, wherein the first person has impaired hearing. The second person audibly emits spoken utterances that are detected by a microphone of the mobile telephone 106, and the mobile telephone 106 transmits a voice signal (that represents the spoken utterances) to the telephone system 102 by way of the voice network 110. Upon the telephone system 102 receiving such voice signal, the forward module 140 can forward the voice signal to the transcription computing system 104 by way of the network 108. The forward module 140 can perform any suitable processing on the voice signal received from the mobile telephone 106 to allow such voice signal to be transmitted to the transcription computing system 104. In an example, the voice signal may be received at the telephone system 102 in a first format and the forward module 140 can transform such format into a second format such that the voice signal transmitted to the transcription computing system 104 is in the second format (e.g., such that the voice signal, when transmitted to the transcription computing system 104, is formatted in accordance with the Voice Over Internet Protocol (VOIP)).

The transcription computing system 104, upon receiving the voice signal from the telephone system 102, is configured to generate a transcription of spoken utterances represented in the voice signal, and is further configured to transmit such transcription to the telephone system 102 by way of the network 108. During a telephone call being conducted by way of the telephone system 102, such process occurs continuously; the telephone system 102 continues to transmit the voice signal to the transcription computing system 104 as the voice signal is received and the transcription computing system 104 generates transcriptions of spoken utterances represented in the voice signal over time based upon the received voice signal.

The transcription computing system 104 can use any suitable technology when transcribing spoken utterances represented in voice signals. For example, the transcription computing system 104 can include a deep neural network (DNN), a recurrent neural network (RNN), a multi-hidden layer RNN, a Hidden Markov Model, etc. As the transcription computing system 104 generates transcriptions based upon the voice signal received from the telephone system 102, the transcription computing system 104 transmits such transcriptions to the telephone system 102.

There may be some delay (caused by network latency and/or processing associated with transcribing spoken utterances) between a time when the telephone system 102 receives the voice signal from the mobile telephone 106 and a time when the telephone system 102 receives a transcription of a spoken utterance represented in the voice signal from the transcription computing system 104 (e.g., 0.5 seconds to 2 seconds). The telephone application 134 further comprises a buffer module 142 that is configured to buffer the received voice signal in a buffer 144. Accordingly, the processor 112 does not cause the handset speaker 128 to immediately audibly emit the spoken utterance based upon the voice signal received from the mobile telephone 106. Instead, the buffer module 142 buffers the voice signal in the buffer 144 until the telephone system 102 receives the transcription of the spoken utterance represented in the voice signal.

The telephone application 134 also comprises a synchronizer module 146 that is configured to synchronize transcriptions received from the transcription computing system 104 with the voice signal received from the mobile telephone 106. In an example, the forward module 140, when forwarding a voice data packet to the transcription computing system 104, can place an identifier in such voice data packet that can identify the voice data packet from amongst numerous voice data packets. The transcription computing system 104, when returning a transcription of a spoken utterance (which may be a word, a phrase, or a sentence) can include such identifier with the transcription of the spoken utterance, thereby indicating that the transcription computing system 104 generated the transcription based upon the voice data packet that was identified by the identifier. The synchronizer module 146 is configured to receive the transcription generated by the transcription computing system 104, identify the identifier therein, and extract the portion of the voice signal from the buffer 144 that corresponds to the identifier. The synchronizer module 146 is then configured to cause the display 118 to display the spoken utterance in text on the display 118 simultaneously with causing the spoken utterance to be audibly output by the handset speaker 128. Put differently, the first person, who is using the telephone system 102, will see the spoken utterance on the display 118 while the spoken utterance is audibly emitted from the handset speaker 128.

In another exemplary embodiment, rather than synchronizing the transcription received from the transcription computing system 104 with a portion of the voice signal that is placed in the buffer 144, the synchronizer module 146 can determine an average time delay between when: 1) a portion of a voice signal that represents a spoken utterance is received from the mobile telephone 106; and 2) when the transcription of the spoken utterance is received from the transcription computing system 104. The synchronizer module 146 can then employ such average delay when retrieving portions of the voice signal from the buffer 144. For instance, if the synchronizer module 146 determines that the average delay is 0.5 seconds, the voice signal can be buffered in the buffer 144 for 0.5 seconds after receipt thereof while a received transcription is displayed on the display 118 immediately upon receipt thereof from the transcription computing system 104. Thus, transcriptions of spoken utterances set forth by the second person who is using the mobile telephone 106 can be shown in a crawling manner on the display 118 simultaneously with the spoken utterances being audibly presented to the first person by way of the handset speaker 128.

In another exemplary embodiment, the transcription computing system 104 and/or the telephone system 102 can generate a spoken utterance based upon the transcription, wherein the spoken utterance is machine-generated and can have an accent and/or tone that is a selected preference of the first person. In another example, the accent and/or tone can be selected by the transcription computing system 104 and/or the telephone system 102 based upon what is inferred to assist the first person hear and comprehend the spoken utterance. Further, in an example, the first person can set forth input as to whether they would like to be provided with the spoken utterance in the voice of the second person or be provided with the spoken utterance that is machine-generated by the transcription computing system 104 and/or the telephone system 102. In either case, the spoken utterance can be audibly emitted by the handset speaker 128 at the same time that the transcription of the spoken utterance is presented on the display 118.

When the switch module 132 ascertains, based upon output of the switch 116, that the telephone system 102 is not being employed in a real-time telephonic communications session, the switch module 132 can cause the processor 112 to execute the communication application 136. The communication application 136 can activate the microphone 120 such that the microphone 120 generates audio signals that are representative of audio in the environment of the telephone system 102. In addition, the communication application 136 can activate the camera 124 such that the camera 124 captures images of surroundings of the telephone system 102. As indicated previously, the communication application 136 is configured to assist a person with impaired hearing with face-to-face communications. The communication application 136 may include an identifier module 150 that is configured to: 1) ascertain whether the first person is participating in a face-to-face conversation with at least one other person; and 2) upon ascertaining that the first person is participating in the face-to-face conversation, optionally ascertain identities of the at least one other person.

For example, the camera 124 can output images that indicate that the first person is in a face-to-face conversation with a second person in the environment of the telephone system 102. For instance, the first person may be facing the second person in the image and the second person may be facing the first person in the image. In addition, the first person and the second person may be close to one another in the image, wherein proximity of the first person to the second person can indicate that the first person and the second person are in conversation with one another. Thus, the identifier module 150 can determine that the first person and the second person are within a threshold distance (e.g., 10 feet) from one another, and can output an indication that the first person and the second person are conducting a face-to-face conversation with one another. In yet another example, people may have electronic identifiers coupled to their bodies (such as on a name tag), wherein the electronic identifiers can be radio frequency identification (RFID) tags or other suitable identifiers. The identifier module 150 can identify people in the environment of the telephone system 102 (and presumably in conversation with the first person) based upon such RFID tags. When there are multiple people in the environment of the telephone system 102 but less than all people in the environment are in a conversation with the first person, the identifier module 150 can disambiguate between those who are participating in the conversation with the first person and those who are not participating in the conversation with the first person.

The communication application 136 also includes a communications forward module 152 that is configured to forward voice data to the transcription computing system 104 by way of the network 108. More specifically, the microphone 120 outputs an audio signal that represents a captured voice utterance emitted by the first person or another person with whom the first person is having a face-to-face conversation. The communications forward module 152 can perform suitable processing on the audio signal (e.g., placing the audio signal in a format that conforms to VoIP or otherwise packetizing content of the audio signal) and can forward the (processed) audio signal to the transcription computing system 104. The transcription computing system 104, upon receiving such voice signal, differentiates between voices of people in the voice signal and generates transcriptions of spoken utterances represented in the voice signal. In an example, the transcription computing system 104 can process the voice signal to create multiple voice signals, one for each person in the conversation. The transcription computing system 104 can separately generate transcriptions for multiple persons in the room based upon the multiple voice signals. Thus, when the first person and second person are having a face-to-face conversation, the voice signal transmitted to the transcription computing system 104 may include a first spoken utterance emitted by the first person and a second spoken utterance emitted by the second person. The transcription computing system 104 can generate a first transcription that includes a transcription of the first spoken utterance and can generate a second transcription that includes a transcription of the second spoken utterance.

In an exemplary embodiment, the transcription computing system 104 can ascertain whether the first spoken utterance set forth by the first person includes a command for the telephone system (such as a command to make a telephone call, a request for weather information, etc.). When the first spoken utterance is not a command, the transcription computing system 104 can discard the transcription of the voice utterance. When the spoken utterance of the first person is a command, the transcription computing system 104 can transmit the transcription of the spoken utterance to the telephone system 102, which can then perform the command based upon content of the transcription. In another example, the transcription computing system 104 can transmit the transcription of the first person to the telephone system 102, and the communication application 136 can ascertain whether the spoken utterance as transcribed is a command. When the communication application 136 ascertains that the spoken utterance is a command, the telephone system 102 can perform such command. When the communication application 136 ascertains that the spoken utterance is not a command, the communication application 136 can discard the transcription.

The communication application 136 further includes an output module 154 that is configured to cause transcriptions of spoken utterances set forth by people having conversations with the person received from the transcription computing system 104 to be presented on the display 118. In an exemplary embodiment, the transcription of the spoken utterance of the person who is using the telephone system 102 is not presented on the display 118; rather, the display 118 depicts transcriptions of spoken utterances emitted by people with whom the person is conversing, but not the transcription of spoken utterances emitted by the person. When the hearing impaired person looks at the display 118, the hearing impaired person can read transcriptions of spoken utterances that the person was unable to hear. In addition, the communication application 136 can provide transcriptions of television programming that is playing in the environment of the telephone system 102, radio programming that is playing in the environment of the telephone system 102, etc.

While the telephone system 102 has been described above with respect to certain embodiments, other embodiments are also contemplated. For instance, the telephone system 102 may be a VoIP system, such that the voice signal from the mobile telephone 106 is received by way of the network 108 (rather than a separate voice network). Moreover, as will be described below, the handset 126 may be a mobile telephone that is in communication with the telephone system 102.

Still further, the telephone system 102 can be configured to generate transcriptions that have been described above as being generated by the transcription computing system 104.

In an exemplary embodiment, the telephone system 102 may be placed in a docking station, wherein the handset 126 is in communication with the telephone system 102 by way of circuitry of the docking station. The telephone system 102 can be removed from the docking station, and can be transported by a user of the telephone system 102 to another location where use of the telephone system 102 is desired (e.g., where it is desirable for a transcription of a face-to-face conversation to be presented). For instance, the docking station can be placed in a room of a resident of an assisted living facility. When the resident goes to a community room (e.g., to eat a meal), the resident can remove the telephone system 102 from the docking station and transport the telephone system 102 to the community room, where the telephone system 102 assists the resident with face-to-face conversations.

In yet another exemplary embodiment, font size of transcriptions presented on the display 118 can be dependent upon whether the telephone application 134 or the communication application 136 causes the transcription to be presented on the display 118. For instance, when the first person is in a telephone conversation using the telephone system 102, presumably the first person is sitting somewhat close to the display 118, and hence the font size of the transcription may be relatively small (e.g., 12 point font, 14 point font, 16 point font, 18 point font, etc.). In contrast, when the telephone system 102 is presenting a transcription of a face-to-face conversation, the first person may be further from the display 118, and thus it may be desirable to present the transcription in larger font (e.g., 20 point font, 22 point font, 24 point font, 26 point font, etc.). In another example, the telephone system 102 can be configured to select a font based upon a detected distance of the first person to the display 118 (e.g., based upon images captured by the camera 124).

Figure 2:
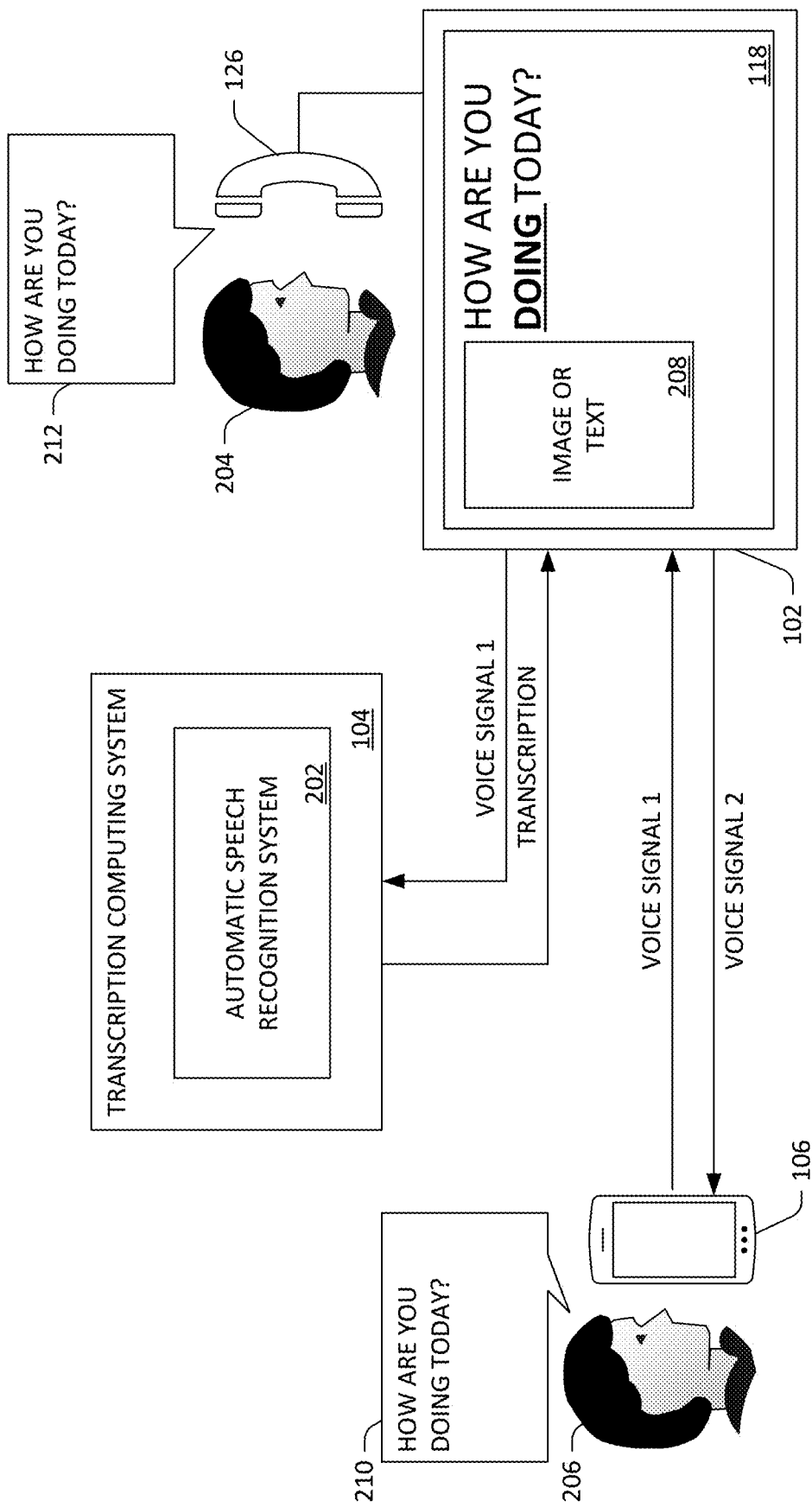
FIGS. 2-7 are schematics that depict exemplary operations of the system illustrated in FIG. 1.

Exemplary operation of the system 100 is described now with respect to FIGS. 2-7. Referring solely to FIG. 2, the transcription computing system 104 is illustrated as including an automatic speech recognition (ASR) system 202. As indicated previously, the ASR system 202 may be or include a DNN, an RRN, or other suitable ASR system. A first person 204 operates the telephone system 102 while a second person 206 operates the mobile telephone 106. A telephonic communication session is established between the telephone system 102 and the mobile telephone 106 by way of the voice network 110 and/or the network 108 (not illustrated in FIG. 2). In an exemplary embodiment, the display 118 can include a field 208 that depicts an image or text 208, wherein the image or text may identify the second person 206. For example, the image or text may include an image of the second person 206, a name of the second person 206, etc. In another example, when the communication session is a video communication session, the field 208 can depict video of the second person 206.

As illustrated, the second person 206 sets forth the spoken utterance "how are you doing today?" to the mobile telephone 106 (as depicted by speech bubble 210) and a microphone of the mobile telephone 106 captures such spoken utterance. The mobile telephone 106 constructs and transmits a first voice signal that represents the spoken utterance "how are you doing today?" to the telephone system 102 by way of the network 108 and/or the voice network 110. Upon the telephone system 102 receiving the first voice signal, the forward module 140 transmits the first voice signal to the transcription computing system 104. In addition, the buffer module 142 can place voice data in the first voice signal in the buffer 144, such that the spoken utterance of the second person 206 is not immediately presented to the first person 204 by way of the handset speaker 128. The transcription computing system 104 receives the first voice signal (potentially after being formatted by the forward module 140), and the ASR system 202 sequentially transcribes words in the spoken utterance represented by such first voice signal. The transcription computing system 104 transmits a transcription of a word, a set of words, a phrase, or a sentence to the telephone system 102. Upon the telephone system 102 receiving the transcription, the synchronizer module 146 synchronizes words in the transcription with the voice data buffered by the buffer module 142 upon which the transcription was generated; put differently, the synchronizer module 146 synchronizes words in the transcription with spoken words represented in the buffered voice data. The synchronizer module 146 then causes the transcription to be presented on the display 118 while also directing the buffered voice data to the handset speaker 128, where audio emitted by the speaker includes swords in the transcription. In the example shown in FIG. 2, the spoken utterance "how are you doing today?" (represented by speech bubble 212) is emitted from the handset speaker 128 simultaneously with the transcribed text "how are you doing today?" being presented on the display 118. Further, the synchronizer module 146 can highlight a word in the transcription shown on the display 118 as such word as audibly emitted by the handset speaker 128. Thus, the word "doing" is highlighted on the display 118 as the word "doing" is audibly emitted from the handset speaker 128, thereby providing the first person 204 with visual cues as to the words being output by way of the handset speaker 128.

In the example shown in FIG. 2, the display 118 depicts an entire sentence, and thus the word "today" is presented on the display 118 prior to the word "display" being audibly emitted by way of the handset speaker 128. Thus, in an exemplary embodiment, the synchronizer module 146 can cause the display 118 to depict an entire sentence received from the transcription computing system 104 and the synchronizer module 146 can cause the handset speaker 128 to emit the spoken utterance audibly (as set forth by the second person 206) after the entire sentence is displayed on the display 118. The synchronizer module 146 can then cause words in the sentence to be highlighted as they are audibly output by the handset speaker 128. In another example, the synchronizer module 146 can display the transcription in a scrolling manner, such that words are presented on the display 118 as such words are audibly emitted by the handset speaker 128.

The first person 204 can respond with a second spoken utterance that is captured by the handset microphone 130, resulting in the telephone system 102 creating a second voice signal and transmitting the second voice signal to the mobile telephone 106 by way of the network 108 and/or the voice network 110. The mobile telephone 106, upon receiving the second voice signal, audibly emits the second spoken utterance by way of a speaker of the mobile telephone 106. Thus, while a slight delay is incurred between a first time when the second person 206 emits the spoken utterance and a second time when the spoken utterance is audibly output by the handset speaker 128 (due to time associated with transmission of the first voice signal from the telephone system 102 to the transcription computing system 104, processing time to generate the transcription, and time associate with transmission of the transcription from the transcription computing system 104 to the telephone system 102), there is nearly no delay between when the first person audibly emits the second spoken utterance and when the second spoken utterance is audibly output by a speaker of the mobile telephone 106.

While the ASR system 202 has been described above as being included in the transcription computing system 104, in other embodiments the ASR system 202 (or at least a portion thereof) may be executed on the telephone system 102.

Figure 3:
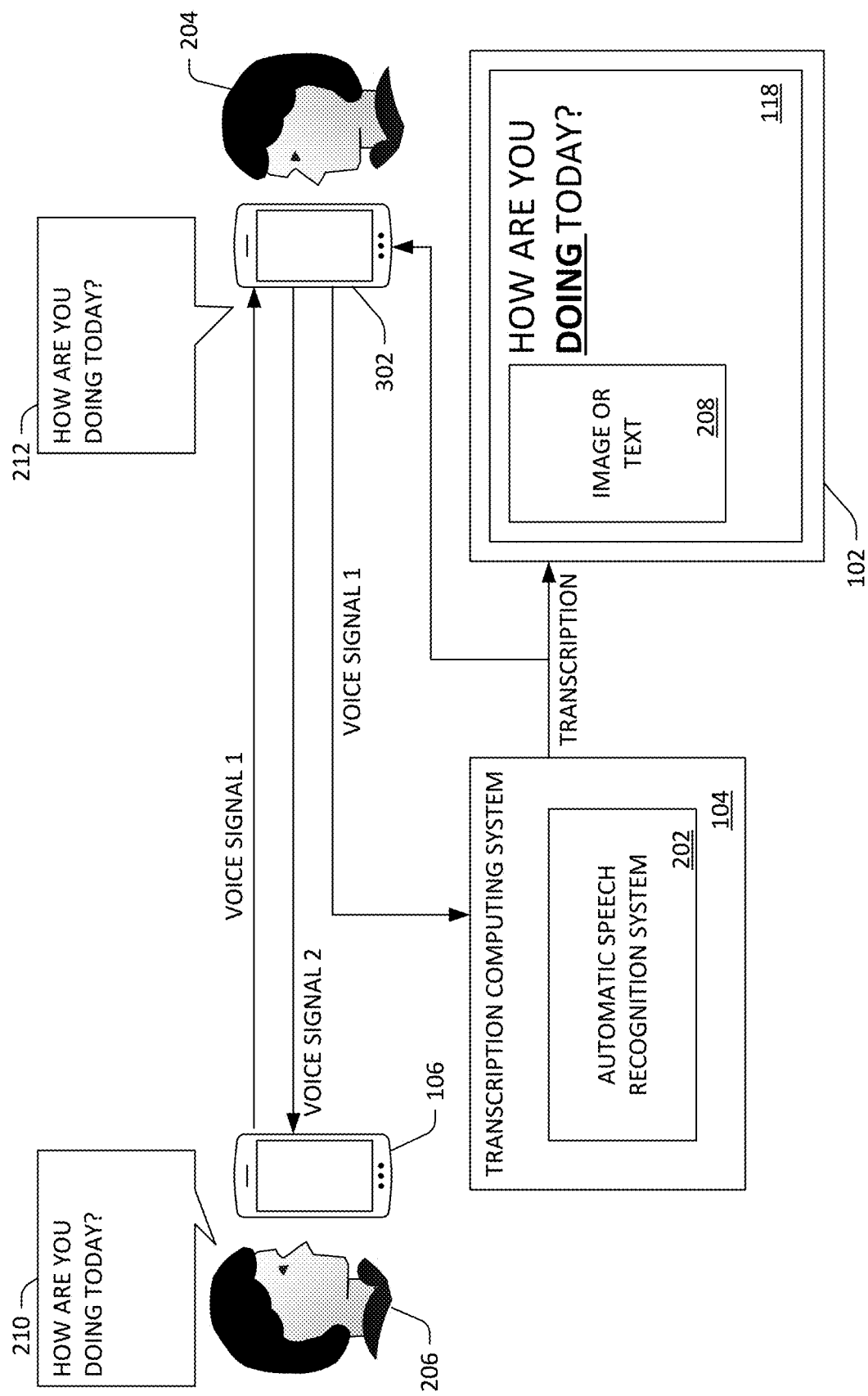

FIG. 3 illustrates exemplary operation of the system 100 where the mobile handset 126 is replaced with a second mobile telephone 302. In the embodiment illustrated in FIG. 3, the second person 206 sets forth the spoken utterance "how are you doing today?" to the mobile telephone 106, which transmits, by way of the network 108 and/or the voice network 110, the first voice signal to the second mobile telephone 302 operated by the first person 204. Instead of immediately outputting the first spoken utterance by way of a speaker of the second mobile telephone 302, the second mobile telephone 302 formats the first voice signal (if necessary) and transmits the first voice signal to the transcription computing system 104. The transcription computing system 104 receives the first voice signal, and the ASR system 202 generates a transcription of the spoken utterance represented in the first voice signal.

There are numerous different approaches that have been contemplated for displaying the transcription of the spoken utterance simultaneously with the spoken utterance being audibly output by the second mobile telephone 302 (and one or more of such approaches may also apply to the embodiment depicted in FIG. 1). In a first approach, the second mobile telephone 302 can include the buffer module 142, the buffer 144, and the synchronizer module 146. The buffer module 142 places voice data in the buffer until the transcription is received from the transcription computing system 104. Upon receiving the transcription, the synchronizer module 146 synchronizes the spoken utterance with the transcription. The synchronizer module 146 can then cause the spoken utterance to be audibly emitted by way of a speaker of the second mobile telephone 302 while transmitting the transcription (by way of a short-range communications protocol) to the telephone system 102, which comprises the display 118. The telephone system 102 displays the transcription on the display 118 simultaneously with the spoken utterance being output audibly to the first person by way of the second mobile telephone 302 (e.g., the mobile telephone 302 audibly emits the spoken utterance immediately upon transmitting the transcription to the telephone system 102).

In a second exemplary approach, the transcription computing system 104 can handle at least some of the synchronization between the second mobile telephone 302 and the telephone system 102. In such an approach, the transcription computing system 104 receives the first voice signal from the second mobile telephone 302, and the second mobile telephone 302 buffers the first voice signal (as described previously). The ASR system 202 generates a transcription of the spoken utterance, and rather than transmitting the transcription to the second mobile telephone 302, the transcription computing system 104 transmits the transcription to the telephone system 102. For instance, the transcription computing system 104 can maintain a mapping between a voice application executing on the second mobile telephone 302 and the telephone application 134 installed on the telephone system 102. Hence, when the transcription computing system 104 receives a voice signal from the voice application executing on the second mobile telephone 302, the transcription computing system 104 can identify the telephone application 134 and transmit the transcription to the telephone system 102 (based upon the telephone application 134). In addition, the transcription computing system 104 can transmit a synchronization signal to the second mobile telephone 302, wherein the synchronization signal identifies voice data in the buffer 144 (on the second mobile telephone 302) upon which the transcription is based. Upon receiving the synchronization signal, the second mobile telephone 302 can retrieve the voice data from the buffer and audibly emit the spoken utterance simultaneously with the spoken utterance being presented on the display 118.

In a third exemplary approach, the transcription computing system 104 synchronizes voice data with the transcription, and re-transmits the first voice signal to the second mobile telephone 302. More specifically, the transcription computing system 104 receives the first voice signal from the second mobile telephone 302, as described above. The second mobile telephone 302, however, discards the first voice signal. The ASR system 202 generates a transcription of the spoken utterance of the second person based upon the first voice signal; the transcription computing system 104 then transmits the first voice signal back to the second mobile telephone 302. The transcription computing system 104 can optionally transmit the transcription to the second mobile telephone, where the transcription is synchronized with the voice signal. The second mobile telephone 302 can audibly output the spoken utterance, and can additionally transmit the transcription to the telephone system 102 by way of a short-range communications channel. In another example, the transcription computing system 104 can transmit the first voice signal to the second mobile telephone 302, and can (concurrently) transmit the transcription to the telephone system 102. In any of such approaches, the spoken utterance is audibly output by the second mobile telephone 302 concurrently with the transcription of the spoken utterance being presented on the display 118 of the telephone system 102.

In the embodiments depicted in FIG. 3, the telephone system 102 can be any suitable type of computing device that includes a display that can display the transcription. Therefore, the telephone system 102 can be a tablet computing device, a laptop computing device, another mobile telephone, a wearable computing device (such as a smartwatch or glasses), a television, a projector, etc. The embodiments described with respect to FIG. 3 are advantageous in that the first person 204 can employ his or her mobile telephone but nevertheless be provided with transcriptions of spoken utterances set forth by the second person 206 during a telephone conversation between the first person 204 and the second person 206.

Figure 4:
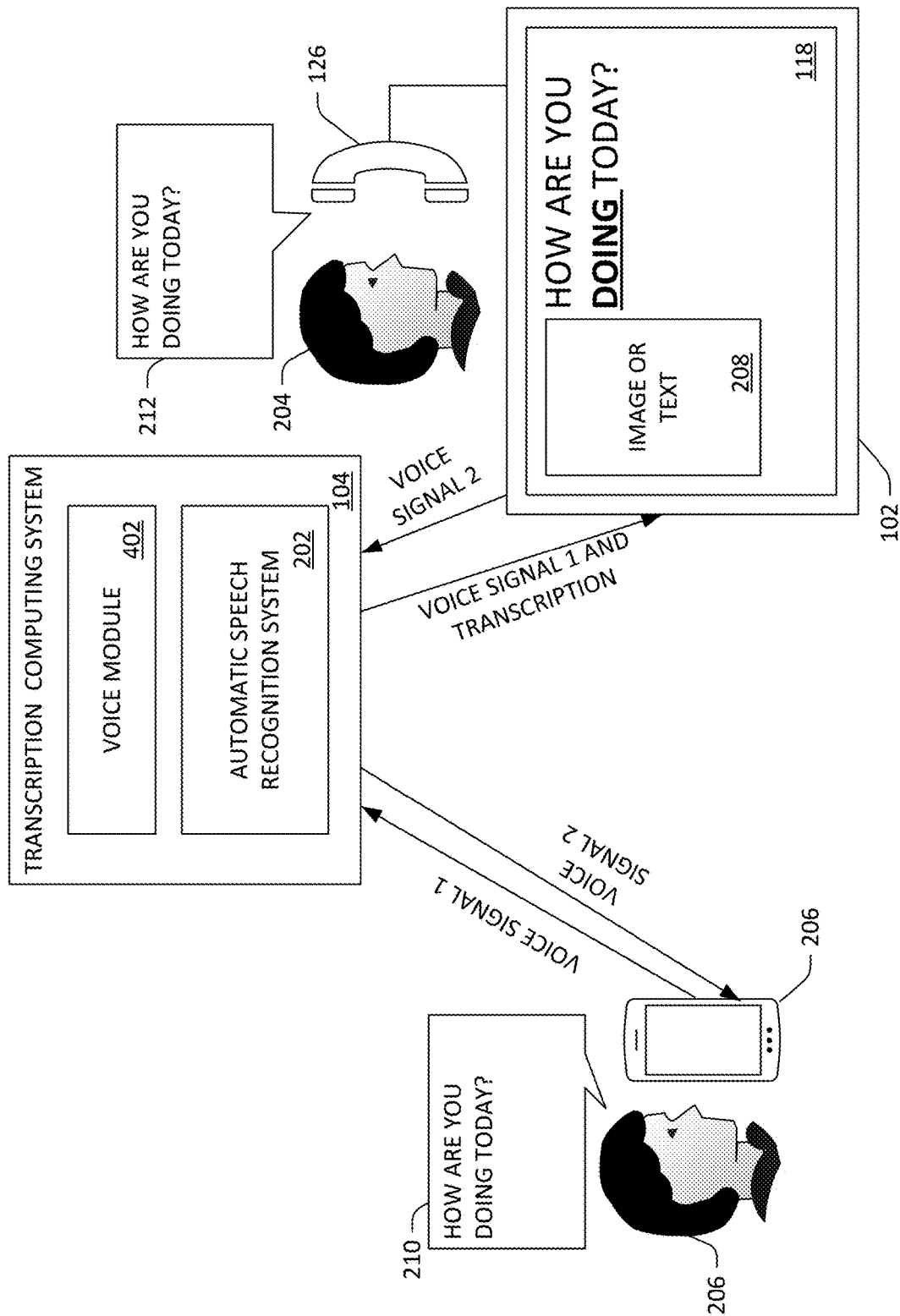

Now referring to FIG. 4, exemplary operation of the system 100 is depicted, wherein the transcription computing system 104 is configured to establish and maintain a voice communication session. In the embodiment illustrated in FIG. 4, the transcription computing system 104 includes a voice module 402 and the ASR system 202. For instance, the voice module 402 can be or include a VoIP server (and/or a videoconferencing server). The voice module 402 establishes a real-time communications session between the mobile telephone 106 and the telephone system 102. Subsequent to the real-time communication session being established, the transcription computing system 104 receives the first voice signal (which includes the spoken utterance "how are you doing today?") from the mobile telephone. The voice module 402 provides the first voice signal to the ASR system 202, and additionally buffers voice data from the first voice signal. Hence, the voice module 402, while not shown, can include the buffer module 142, the buffer 144, and the synchronizer module 146. As described above, the ASR system 202 receives the first voice signal and generates a transcription of the spoken utterance represented by the first voice signal. The voice module 402 receives the transcription, and transmits the transcription (and synchronized audio and video) to the telephone system 102. Thus, the transcription computing system 104 transmits the first voice signal and the transcription to the telephone system 102. The telephone system 102, as before, displays the transcription of the spoken utterance on the display 118 simultaneously with the spoken utterance being audibly output by way of the handset speaker 128.

Figure 5:
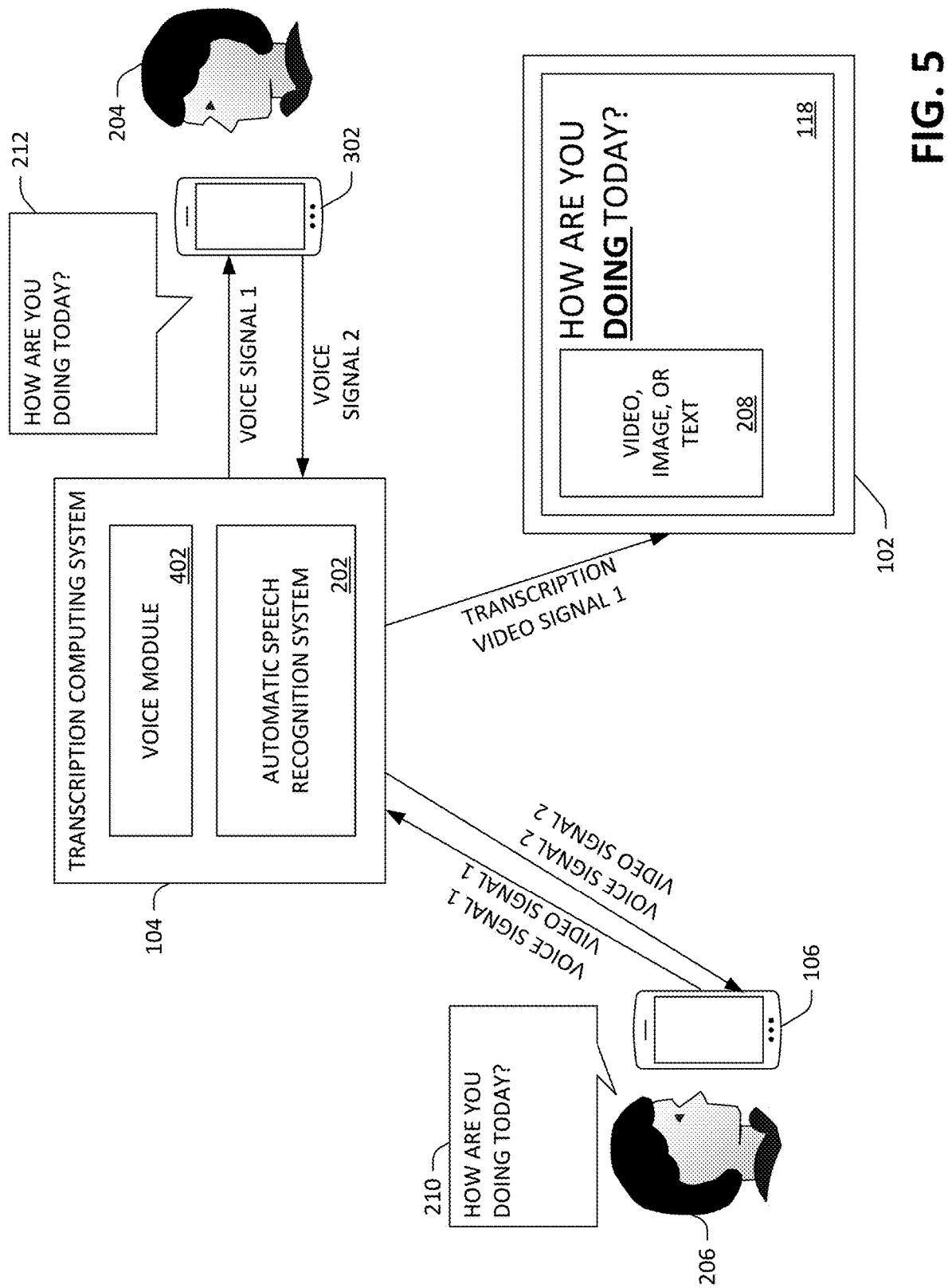

With reference now to FIG. 5, exemplary operation of the system 100 is illustrated, wherein the mobile telephone 106 and the second mobile telephone 302 are communicating by way of the transcription computing system 104 (which includes the ASR system 202 and the voice module 402). In the example shown in FIG. 5, the first person 204 is employing the second mobile telephone 302 to communicate with the second person 206. The mobile telephone 106 and the second mobile telephone 302 may each have a video conferencing application installed thereon, a universal communications application installed thereon, etc. The transcription computing system 104 can receive the first voice signal from the mobile telephone 106 and the voice module 402 can buffer voice data in the voice signal (as described with respect to FIG. 4). The ASR system 202 generates a transcription of the spoken utterance represented in the voice signal and, in an exemplary embodiment, the transcription computing system 104 transmits such transcription to the telephone system 102 (which may also have the video conferencing application installed thereon, the UC application installed thereon, etc.). The transcription computing system 104, concurrently with transmitting the transcription for display on the display 118 of the telephone system 102, transmits the buffered voice data in the first voice signal to the second mobile telephone 302, whereupon the second mobile telephone 302 outputs the spoken utterance to the first person 204. Again, the first person 204 is presented with the spoken utterance by way of the second mobile telephone 302 at the same time that a transcription of the spoken utterance is presented on the display 118 of the telephone system 102.

In addition, when a videoconferencing application is employed in a communications session between the mobile telephones 106 and 302, the field 208 may also depict video of the second person 206. The video, like the first voice signal, can be buffered so that the video is presented on the display 118 at the same time that the spoken utterance is emitted by way of the second mobile telephone 302 (e.g., the video is synchronized with the spoken utterance, and is further synchronized with the transcription). Presentment of the synchronized video can provide the first person 204 with additional information to assist the first person 204 in connection with communicating with the second person 206. For example, the first person 204 can attempt to read lips of the second person 206 (in video presented in the field 208) while also being provided with a transcription of the spoken utterance on the display 118, while still further being provided with the spoken utterance by way of the second mobile telephone 302.

Similar to the embodiment described with respect to FIG. 3, in an alternative embodiment the transcription computing system 104 may transmit the transcription, the voice signal, and the video (synchronized with one another) to the second mobile telephone 302. The second mobile telephone 302 may be configured to forward the video and the transcription to the telephone system 102 by way of a short-range communications protocol (e.g., WiFi direct, Bluetooth, etc.). If the video would consume too much bandwidth, the video can be replaced with a still image or text that describes or identifies the second person 206. An advantage of the embodiment illustrated in FIG. 5 is that the first person 204 can continue to use a mobile telephone that is familiar to the first person 204, may employ videoconferencing applications that are used by friends and/or family, and can nevertheless be provided with a transcription of spoken utterances set forth by the second person 206 during the real-time communications session.

Figure 6:
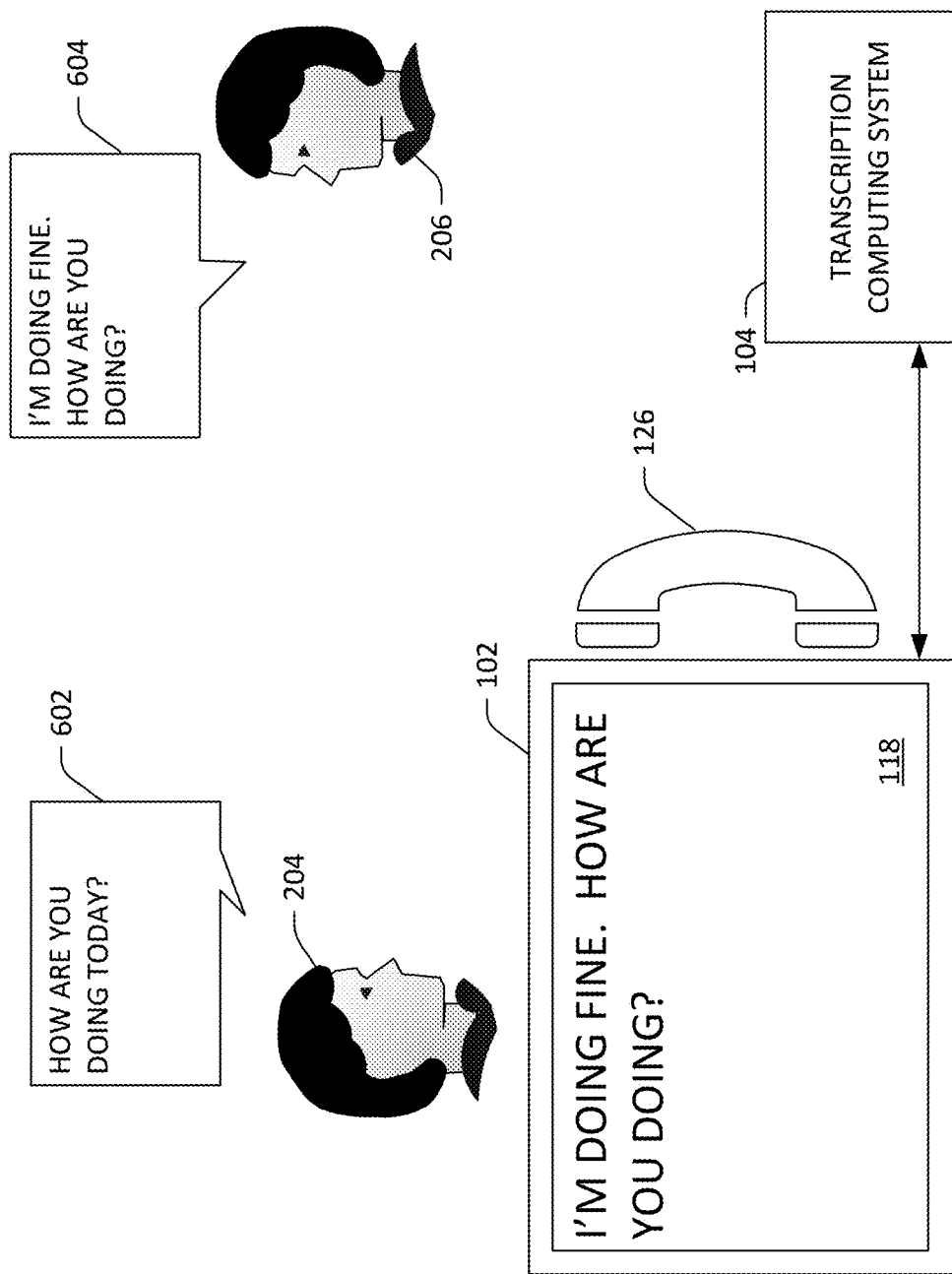

Now referring to FIG. 6, operation of the telephone system 102 when the communication application 136 is executed by the processor 112 is depicted. The switch 116 has output a signal that indicates that the telephone system 102 is not employed in a real-time telephone or videoconferencing communication session, and the switch module 132 causes the processor 112 to execute the communication application 136 based upon the signal. The first person 204 and the second person 206 are having a conversation in proximity to the telephone system 102. The microphone 120 captures audio of the surroundings of the telephone system 102 and generates an audio signal and the communications forward module 152 transmits the audio signal to the transcription computing system 104. The audio signal can represent spoken utterances of both the first person 204 and the second person. For instance, over time, the audio signal can represent a first spoken utterance emitted by the first person 204 (e.g., the spoken utterance "How are you today?", represented by speech bubble 602) and can further represent a second spoken utterance emitted by the second person 206 (e.g., the spoken utterance "I'm doing fine. How are you doing?", represented by speech bubble 604).

The transcription computing system 104 can perform several actions with respect to the audio signal. Specifically, the transcription computing system 104 can differentiate between spoken utterances emitted by the first person 204 and spoken utterances emitted by other people. For example, the telephone system 102 can transmit an identifier of the first person 204 with the audio signal, wherein the telephone system 102 transmits such identifier due to the telephone system 102 belonging to the first person 204 (rather than the second person). In another example, the camera 124 of the telephone system 102 can capture an image of the first person 204 (who may be facing the telephone system 102), and the telephone system 102 and/or the transcription computing system 104 can identify the first person 204 based upon the image (e.g., the telephone system 102 may transmit the image to the transcription computing system 104). Based upon the identity of the first person 204, the transcription computing system 104 can access a voice profile for the first person 204 that is stored at the transcription computing system 104. Using the voice profile, the transcription computing system 104 can identify which spoken utterances in the audio signal are emitted by the first person 204 and which spoken utterances in the audio signal are emitted by some other person or persons in proximity to the telephone system 102.

When the transcription computing system 104 determines that a spoken utterance has been emitted by the first person 204, the transcription computing system 104 can utilize spoken language understanding (SLU) technologies to ascertain whether the first person 204 is issuing a command to the telephone system 102 and/or the transcription computing system 104. For instance, the second person 206 may be in proximity to the telephone system 102, but may not be in conversation with the first person 204. Instead, the second person 206 may be speaking with a third person (not shown), speaking on a mobile telephone, etc. The first person 204 may issue a voice command to the telephone system 102, such as a command to initiate a telephone conversation with a contact, a command to dial an emergency number, etc. When the transcription computing system 104 ascertains that the spoken utterance set forth by the first person 204 is a command for the telephone system 102, the transcription computing system 104 can transmit a transcription of the spoken utterance to the telephone system 102, whereupon the telephone system 102 can perform the command. Alternatively, the transcription computing system 104 can perform the command.

When the transcription computing system 104 ascertains that the audio signal fails to include a spoken utterance set forth by the first person 204 or when the audio signal includes a spoken utterance set forth by the first person that is not a command, the transcription computing system 104 can generate a transcription of a spoken utterance emitted by the second person 206 and transmit such transcription to the telephone system 102. The telephone system 102 then presents the transcription on the display 118 of the telephone system (e.g., in a scrolling manner along the display 118). Therefore, the first person 204 can review the display 118 of the telephone system 102 and ascertain what is being said by the second person 206. For instance, as illustrated in FIG. 6, the display depicts the spoken utterance "I'm doing fine. How are you doing?" as emitted by the second person 206. Further, it is noted that the display 118 fails to include the spoken utterance set forth by the first person 204, as the transcription computing system 104 can filter such spoken utterance based upon the voice profile assigned to the first person 204.

While several techniques for identifying the first person 204 have been set forth above, other techniques are also contemplated. For example, the first person 204 may have an electronic identifier, such as an RFID tag or other emitter, attached to an article of clothing. Based upon an identifier output by the RFID tag and an estimated location of the RFID tag relative to the telephone system 102, the telephone system 102 and/or the transcription computing system 104 can ascertain that the first person 204 is viewing the screen (and thus should not be provided with a transcription of his or her own spoken utterances). In such an embodiment, the telephone system 102 can include an RFID reader (not shown). Moreover, rather than the transcription computing system 104 disambiguating between spoken utterances emitted by the first person 204 and the second person 206, the telephone system 102 can be configured to disambiguate between the spoken utterances of such people 204 and 206.

Figure 7:
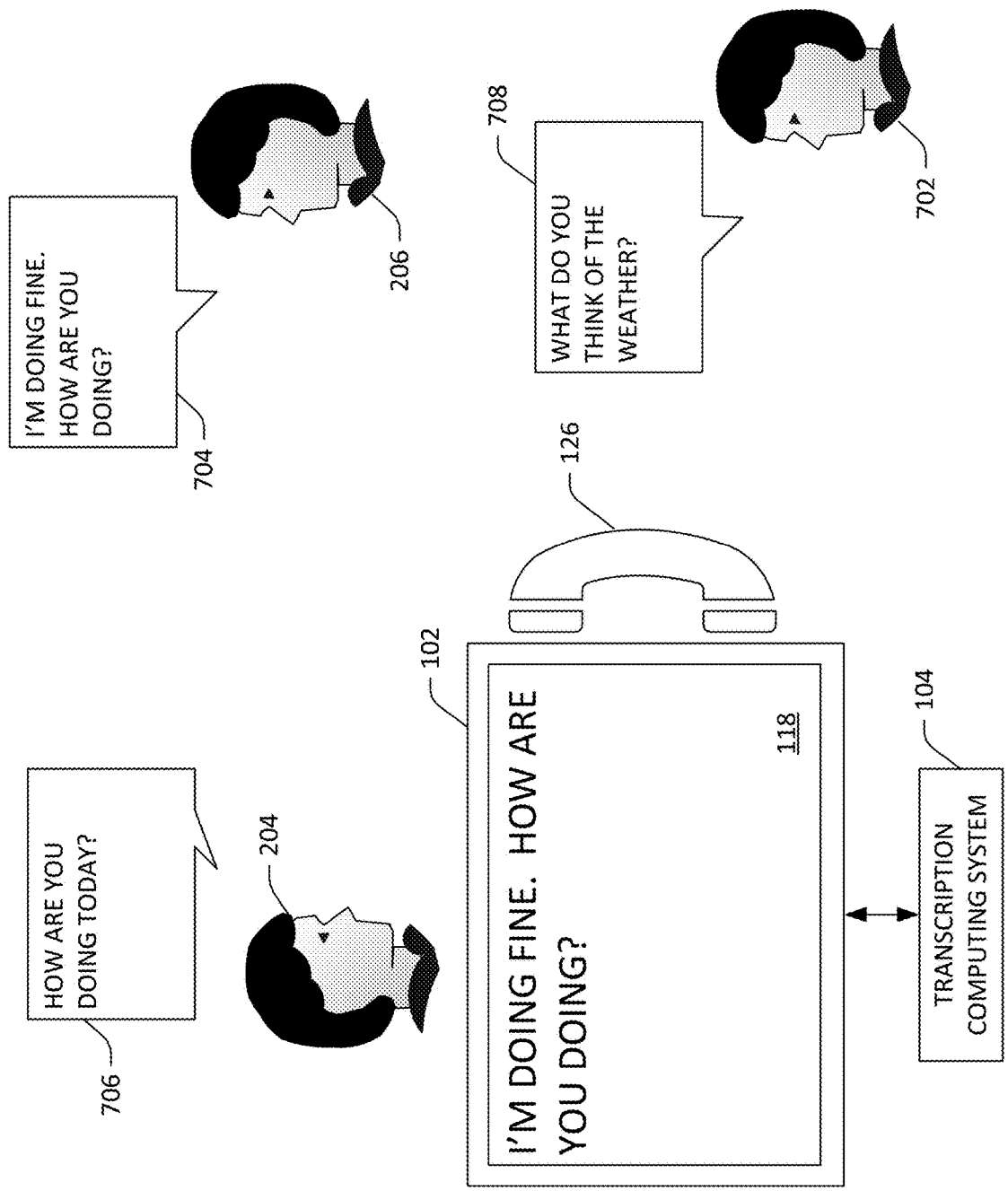

Now referring to FIG. 7, exemplary operation of the system 100 is again depicted, wherein multiple people are in proximity to the telephone system 102 but at least one of such people is not participating in a conversation with the first person 204. In the example illustrated in FIG. 7, the first person 204 is having a conversation with the second person 206, while a third person 702 is in proximity of the telephone system 102 and is emitting a spoken utterance but is not in conversation with the first person 204. In another example, an electronic device (such as a television) may be emitting spoken utterances in proximity to the telephone system 102.

In such an example, the telephone system 102 can identify the people and/or electronic devices that are in proximity to the telephone system 102. For instance, as indicated previously, the first person 204, the second person 206, and the third person 702 may have RFID tags (or other electronic emitters) coupled to their clothing, and the telephone system 102 can identify the people in proximity to the telephone system 102 based upon output of the RFID tags. Alternatively, the telephone system 102 can transmit identifying information to the transcription computing system 104, which can identify the people in proximity to the telephone system 102. Based upon profiles of such people, the telephone system 102 and/or the transcription computing system 104 can ascertain if one of the people is not likely participating in a conversation with others. In another example, the camera 124 of the telephone system 102 can capture images of surroundings of the telephone system 102, and the telephone system 102 and/or the transcription computing system can determine which of the people are in conversation with one another and which are not. For instance, the telephone system 102 and/or the transcription computing system 104 can identify head poses of the people 204, 206, and 702 and identify which (if any) of the persons 206 and 702 is in conversation with the first person 204.

The transcription computing system 104 can include voice profiles for the people. For instance, in an assisted living facility, the transcription computing system 104 can include voice profiles for residents and staff at the facility. The transcription computing system 104 can identify the voice profiles based upon the identities of the people in proximity to the telephone system 102. When the transcription computing system 104 receives an audio signal from the telephone system 102, the transcription computing system 104 can identify which spoken utterance was emitted by which person (as represented in the audio signal) based upon the voice profiles. The transcription computing system 104, in the example shown in FIG. 7, can provide a transcription of the spoken utterance "I'm doing fine. How are you doing?" (represented by speech bubble 704), and the transcription can be presented on the display 118 (for viewing by the first person 204). The transcription computing system 104 can filter the spoken utterance "How are you doing today?" emitted by the first person 204 (represented by speech bubble 706), as the first person 204 is using the telephone system 102. The transcription computing system 104 can also filter the spoken utterance "What do you think of the weather?" (represented by speech bubble 708) emitted by the third person 702, as the third person 702 is not in conversation with the first person 204 (even though the microphone 120 can pick up spoken utterances emitted by the third person 702).

When the transcription computing system 104 ascertains that both the second person 206 and the third person 702 are in conversation with the first person 204, the transcription computing system 104 can generate transcriptions of the spoken utterances emitted by such persons 206 and 702, and can label the spoken utterances on the display 118 as being emitted by the appropriate person. For instance, the display 118 can indicate that the spoken utterance "I'm doing fine. How are you doing?" was emitted by the second person 206, while the display 118 can indicate that the spoken utterance "What do you think of the weather?" was emitted by the third person 702. Further, the transcriptions can be ordered in time (based upon when the spoken utterances were emitted). Additionally, the transcription computing system 104 can filter spoken utterances emitted by electronic devices, such as televisions, when the telephone system 102 detects multiple people in proximity to the telephone system 102. When the telephone system 102 detects that no one other than the person 204 is in proximity to the telephone system 102, the telephone system 102 can transmit the audio signal to the transcription computing system 104, and the transcription computing system 104 can return a transcription of spoken utterances in the audio signal for presentment on the display 118. Thus, the telephone system 102 can act as a closed captioning system for the first person 204.

Based upon the foregoing, it can be ascertained that the telephone system 102 exhibits various advantages over conventional captioned telephone systems. As described above captioned telephone systems require that a human listener be provided with audio in any telephone conversation where a transcription is to be provided to the captioned telephone system. In contrast, the telephone system 102 described herein does not route a call to a human listener that is not taking part in the conversation. In addition, in captioned telephone systems, spoken utterances are presented to the hearing-impaired person well before the transcription is displayed to such person, which may result in confusion to the person (e.g., the person is audibly provided with spoken utterances that do not appear on the display for some duration in time). In contrast, the telephone system 102 described herein is configured to synchronize spoken utterances with transcriptions, such that a hearing-impaired person is simultaneously provided with the spoken utterance and the transcription. Moreover, unlike conventional captioned telephone systems, the telephone system 102 described herein is also configured to assist a hearing-impaired person in face-to-face communications, such that the hearing-impaired person is also provided with a transcription of spoken utterances set forth by other people in proximity to the telephone system 102. It is also to be understood that the telephone system 102 may be used in scenarios where the person fails to have a hearing impairment, but the background is noisy; for example, busy call centers, a restaurant, and so forth.

Figure 8:
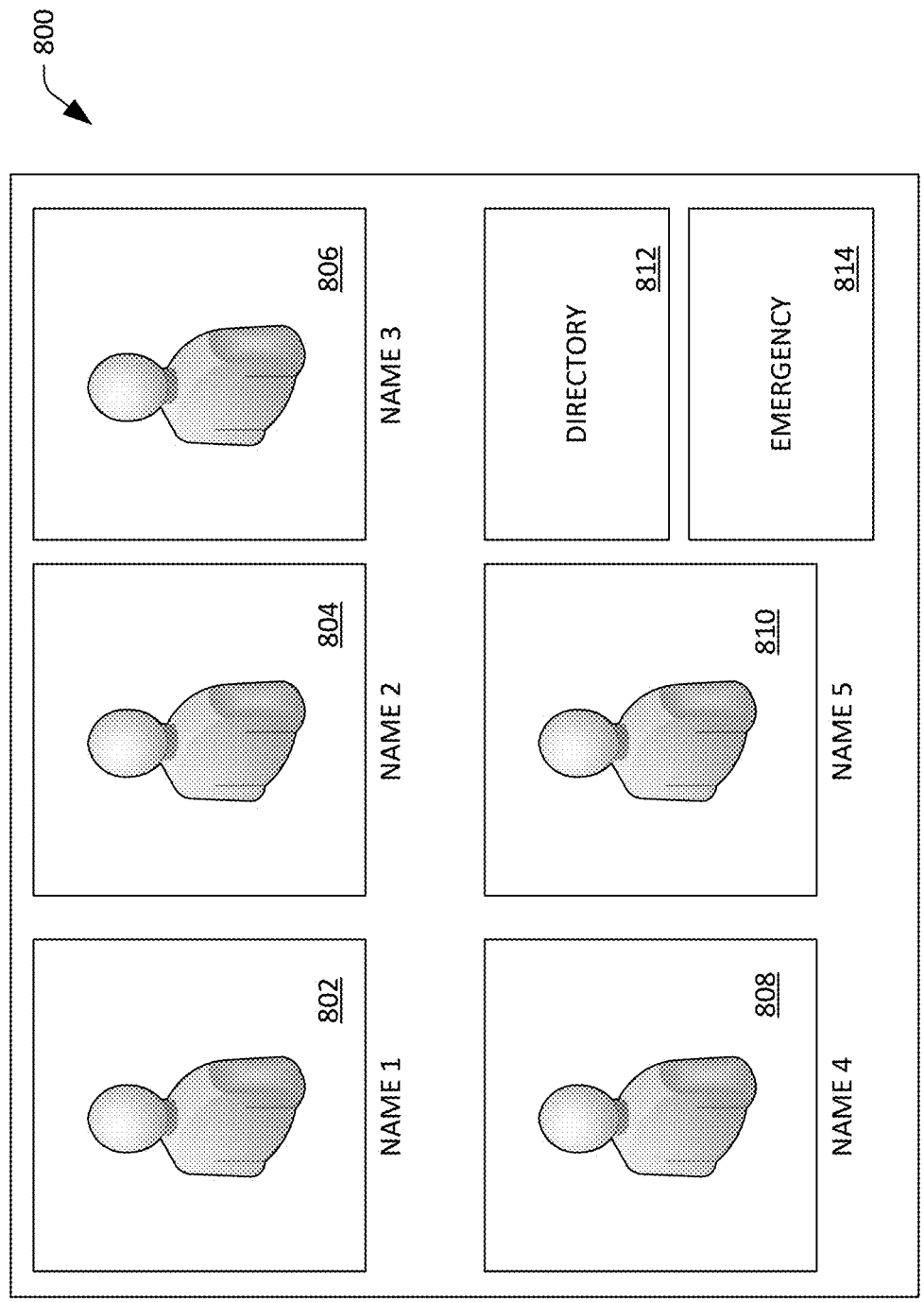
FIGS. 8 and 9 depict exemplary graphical user interfaces (GUIs) of a telephone system that is configured to assist people with hearing impairments when participating in telephone conversations.

Now referring to FIG. 8, an exemplary graphical user interface (GUI) 800 for the telephone application 134 is illustrated, wherein the GUI 800 may be presented on the display 118 when: 1) the telephone system 102 is not being used in a real-time telephone session; and 2) when the telephone system 102 is not depicting transcribed text of a face-to-face conversation. In another example, the GUI 800 may be presented on the display 118 upon the first person 204 picking up the handset 126 (but prior to a telephone communication session being established). The display 118 may be a touch-screen display and can display images or avatars of people with whom the first person 204 communicates via the telephone system 102 most often. For instance, the first person 204 may reside in an assisted living facility and may frequently talk to his or her five children. In such case, the contacts with whom the first person 204 most frequently communicates by way of the telephone system 102 can be represented by five images 802-810, with each image having a name corresponding thereto. Each of the images 802-810 is selectable. Upon the first person 204 selecting one of the images 802-810, the telephone application 134 initiates a telephone call with a telephone number associated with the person represented by the selected image. Hence, when the first person 204 selects the second image 804, the telephone application 134 is configured to dial a telephone number for a contact of the first person 204 that is represented by the second image 804.

The graphical user interface 800 may also include a button 812 that represents a directory, wherein upon the button 812 being selected a list of contacts of the first person 204 can be presented and the first person 204 can scroll through the contacts (e.g., arranged in alphabetical order).

When the first person 204 selects a contact, the telephone application 134 is configured to dial a telephone number for such contact (or otherwise initiated a real-time communications session with the contact, such as by way of a video conferencing application). The GUI 800 may also include an emergency button 814, wherein upon the emergency button 814 being selected, the telephone application 134 initiates a real-time communication session with a responder. For instance, the telephone application 134 can dial an emergency telephone number, may initiate a peer-to-peer communication session with the responder that is in the assisted living facility, and so forth.

Figure 9:
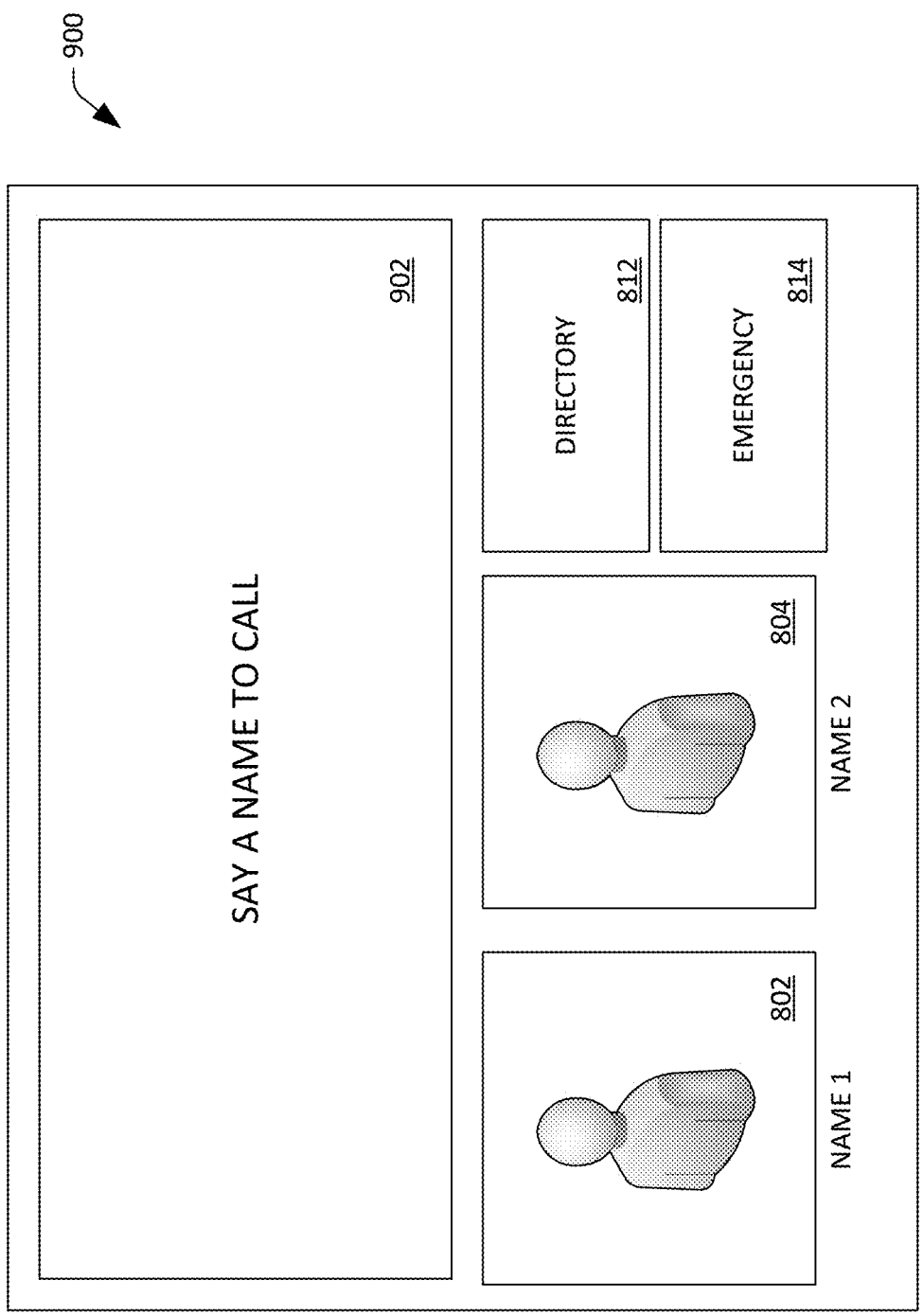

Now referring to FIG. 9, another exemplary GUI 900 for the telephone application 134 that can be presented on the display 118 is illustrated. The GUI 900 includes a window 902. In an exemplary embodiment, the window 902 can include an instruction to the first person 204, wherein the instructions indicate that for the first person 204 to initiate a real-time communication session by way of the telephone system 102 with a contact, the first person 204 is to emit a name of the contact (optionally with a command, such as "call John Doe"). It is to be noted that the GUI 900 includes only buttons that correspond to the telephone application 134, which may enhance usability for elderly users. Moreover, as described previously, the telephone system 102 is in constant communication with the transcription computing system 104; thus, if the first person 204 audibly emits the command "call John Doe", the microphone 120 will generate an audio signal and the telephone system 102 transmits the audio signal to the transcription computing system 104. The transcription computing system 104, in an exemplary embodiment, recognizes the command and transmits a transcription of such command to the telephone system 102. The telephone application 134 may then initiate a telephone call with a telephone number associated with the contact identified in the transcription.

In another exemplary embodiment, the window 902 may be a button, wherein the first person 204 can indicate that a command for the telephone application 134 is forthcoming by selecting such button. Thus, the telephone application 134 receives an indication that the first person 204 has selected the button, and the microphone 120 generates an audio signal that represents a spoken utterance of the first person 204. The spoken utterance is labeled as a command, as such utterance was set forth while the button was selected. Either the telephone system 102 and/or the transcription computing system 104 transcribes the spoken utterance, and the telephone system 102 performs the command in the spoken utterance.

The GUI 900 can include the images 802 and 804, which represent contacts with whom the first person 204 most often has telephone conversations. The GUI 900 also includes the buttons 812 and 814.

While not previously described, it is to be understood that the telephone system 102 can be configured to support receipt and transmittal of text messages, wherein transmitted text messages are generated based upon voice commands set forth by the first user 204. For example, and with reference to FIG. 9, the button 802 (representing a first contact of the first user 204) can be selected. Upon such button being selected, two additional buttons may be presented: 1) a first button that, when selected, causes the telephone system 102 to initiate a telephone conversation with the first contact; and 2) a second button that, when selected, causes a window to be presented, wherein the window depicts a transcription of voice utterances set forth by the first user 204. The first user 204 may then cause the telephone system 102 to transmit the text message to a computing system of the first contact (represented by the button 802). The telephone system 102 can generate the transcription (through transcription software executing on the telephone system 102) or the telephone system 102 can transmit voice data to the transcription computing system 104, which can generate the transcription and provide the transcription back to the telephone system 102.

Figure 10:
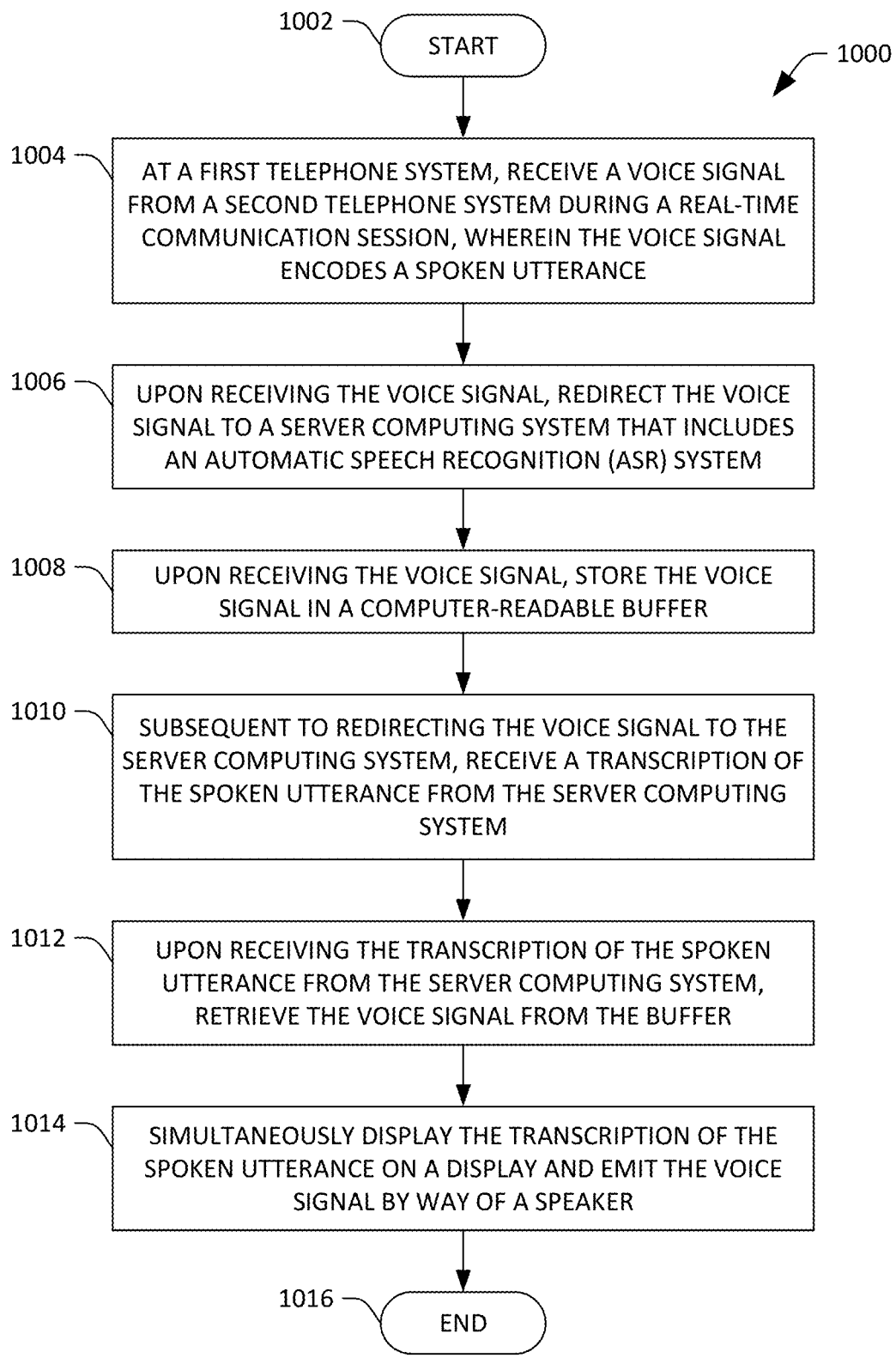
FIG. 10 is a flow diagram illustrating an exemplary methodology for concurrently displaying a transcription of a spoken utterance and audibly emitting the spoken utterance.
Figure 11:
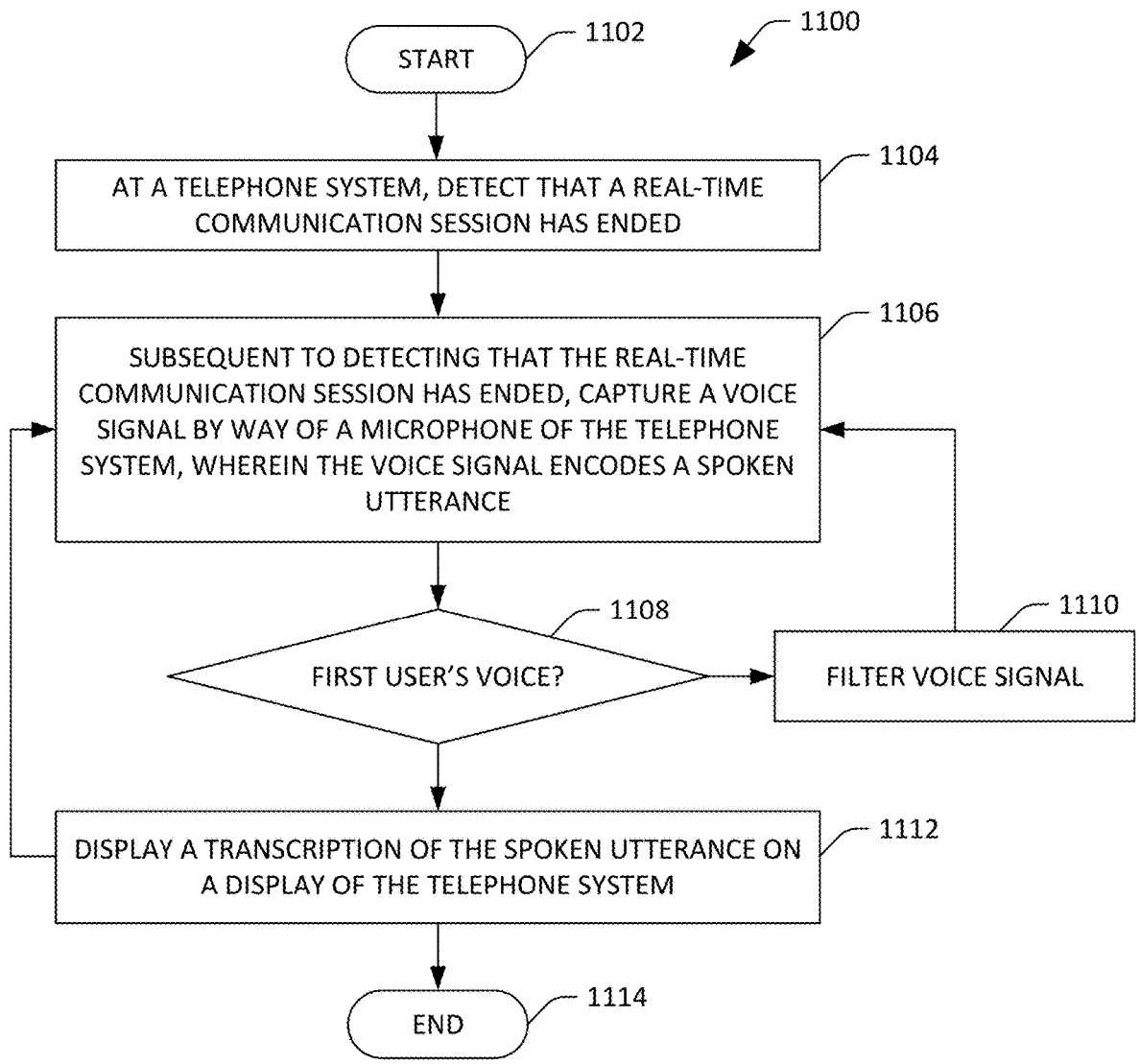
FIG. 11 is a flow diagram illustrating an exemplary methodology for transcribing spoken utterances in a face-to-face conversation.

FIGS. 10-11 illustrate exemplary methodologies relating to a telephone system that is well-suited for use by a person with a hearing impairment. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 10, a flow diagram illustrating an exemplary methodology 1000 for simultaneously emitting a voice signal that encodes a spoken utterance while presenting a transcription of the spoken utterance is illustrated. The methodology 1000 starts 1002, and at 1004, at a first telephone system, a voice signal is received from a second telephone system during a real-time communication session (e.g., during a telephone call or videoconference), wherein the voice signal encodes a spoken utterance.

At 1006, upon receiving the voice signal, the voice signal is redirected to a server computing system that includes an ASR system. As indicated previously, prior to redirecting the voice signal, such voice signal may be formatted in a manner that allows for transmission of the voice signal over the network 108. At 1008, upon the voice signal being received, such voice signal is stored in a computer readable buffer. Accordingly, the voice signal is not immediately audibly output to a speaker of the first telephone system.

At 1010, subsequent to redirecting the voice signal to the server computing system, a transcription of the spoken utterance is received from the server computing system. At 1012, upon receiving the transcription of the spoken utterance from the server computing system, the voice signal is retrieved from the buffer. At 1014, the transcription of the spoken utterance is displayed on the display simultaneously with audible emission of the spoken utterance (based upon the voice signal) by way of a speaker of the first telephone system. In addition, words in the spoken utterance can be highlighted as such words are audibly output by way of the speaker of the first telephone system. The methodology 1000 completes at 1016.

Now referring to FIG. 11, a flow diagram illustrating an exemplary methodology 1100 for assisting a first person with a hearing impairment in a face-to-face conversation is illustrated. The methodology 1100 starts at 1102, and at 1104, at a telephone system, it is detected that a real-time communication session between the first person and another person using a communications device (e.g., a mobile telephone) has ended. Such real-time communication session may be a telephone call, a videoconferencing session, etc. At 1106, subsequent to detecting that the real-time communication session has ended, a voice signal is captured by way of a microphone of the telephone system, wherein the voice signal encodes a spoken utterance.

At 1108, a determination is made as to whether the spoken utterance encoded in the voice signal was emitted by the first person (the operator of the telephone system). When it is determined that the spoken utterance was emitted by the first person, at 1110, the voice signal is filtered such that the spoken utterance is no longer encoded in the voice signal. When it is determined that the spoken utterance was not emitted by the first person (and is therefore presumably emitted by someone having a face-to-face conversation with the first person), at 1112 a transcription of the spoken utterance is displayed on a display of the telephone system. The methodology 1100 completes at 1114.

Figure 12:
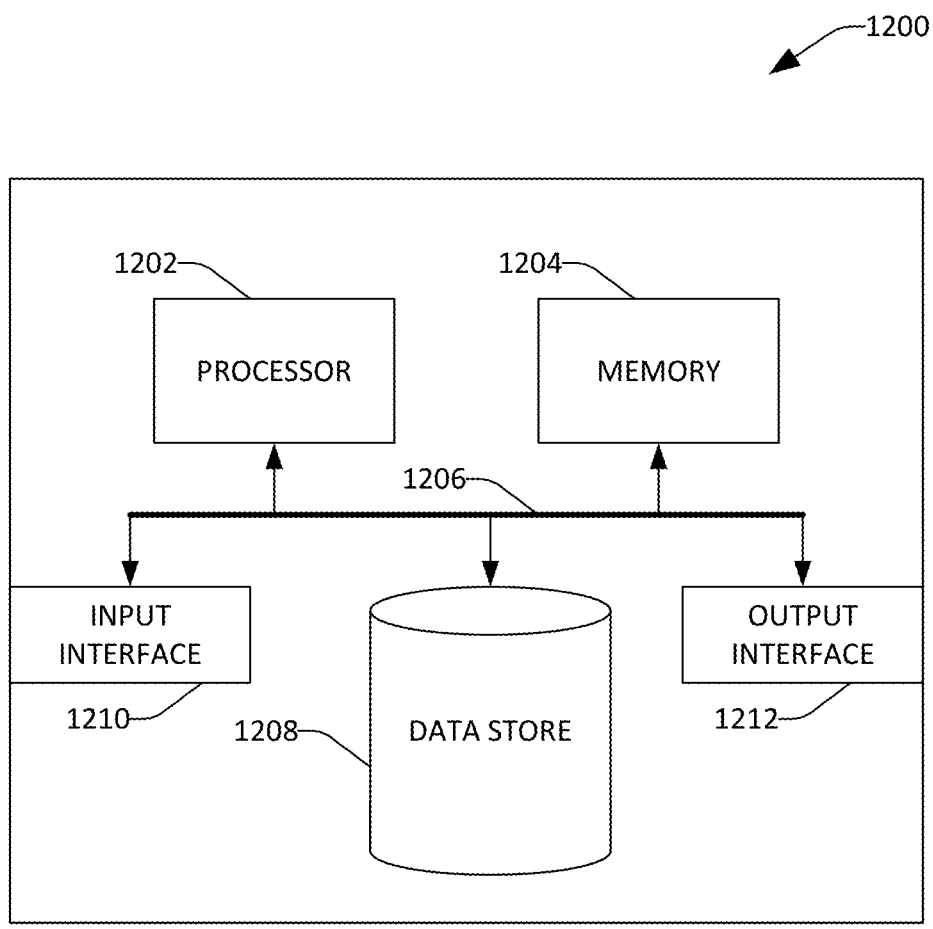
FIG. 12 depicts an exemplary computing system.

Referring now to FIG. 12, a high-level illustration of an exemplary computing device 1200 that can be used in accordance with the systems and methodologies disclosed herein is illustrated. For instance, the computing device 1200 may be used in a system that is configured to display transcriptions on a display simultaneously with audibly emitting spoken utterances that correspond to such transcriptions. By way of another example, the computing device 1200 can be used in a system that is configured to generate transcriptions of spoken utterances. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store transcriptions, voice signals, voice profiles, identities of contacts of a person, etc.

The computing device 1200 additionally includes a data store 1208 that is accessible by the processor 1202 by way of the system bus 1206. The data store 1208 may include executable instructions, transcriptions, voice signals, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system operated by a first person, the computing system comprising:
   a processor;
   a microphone that is operably coupled to the processor; and
   memory storing instructions that, when executed by the processor, cause the processor to perform acts comprising:
      receiving, by way of a network connection between the computing system and a second computing system operated by a second person, a voice signal that encodes a spoken utterance of the second person, wherein the spoken utterance is a portion of a real-time communication session between the first person and the second person;
      immediately in response to receiving the voice signal, transmitting the voice signal to a server computing device, wherein the server computing device executes an automatic speech recognition (ASR) system, wherein the ASR system generates a transcription of the spoken utterance upon receipt of the voice signal;
      in response to receiving the voice signal, buffering the voice signal in the memory of the computing system;
      receiving, from the server computing device, the transcription;
      immediately upon receiving the transcription from the server computing device:
         directing the buffered voice signal to a speaker such that the speaker audibly outputs the spoken utterance to the first person;
         causing the transcription to be presented on a display such that the spoken utterance is presented on the display to the first person simultaneously with the speaker audibly outputting the spoken utterance to the first person or prior to the speaker audibly outputting the spoken utterance to the first person; and
      causing a second voice signal to be transmitted to the second computing system, wherein the second voice signal is based upon a second spoken utterance set forth by the first person, wherein the second spoken utterance is captured by the microphone, wherein the computing system fails to transmit the second voice signal to the server computing device.

2. The computing system of claim 1, wherein the spoken utterance is presented on the display to the first person prior to the speaker audibly outputting the spoken utterance, the acts further comprising highlighting a word in the spoken utterance on the display as the speaker audibly outputs the word to the first person.

3. The computing system of claim 1 being a telephone system, wherein the telephone system comprises a handset that includes the speaker, and further wherein the telephone system comprises the display.

4. The computing system of claim 1, the acts further comprising:
   determining an identity of the second person based upon an identifier for the second person received by the computing system; and
   displaying graphical data that identifies the second person on the display concurrently with the spoken utterance, wherein the graphical data is at least one of an image of the second person or a name of the second person.

5. The computing system of claim 1, the acts further comprising:
   detecting that the real-time communication session has ended;
   capturing, by way of the microphone, a third voice signal, wherein the third voice signal represents a third spoken utterance output by a third person in an environment of the computing system;
   immediately upon capturing the third voice signal, transmitting the third voice signal to the server computing device, wherein the ASR system generates a second transcription of the third spoken utterance upon receipt of the third voice signal;
   receiving, from the server computing device, the second transcription; and
   immediately upon receiving the second transcription from the server computing device, causing the second transcription to be presented on the display to the first person.

6. The computing system of claim 1, wherein the transcription is presented on the display in 16 point font.

7. The computing system of claim 1, the acts further comprising:
   prior to receiving the voice signal, receiving an indication that the first person has picked up a handset that is coupled to the computing system;
   receiving, by way of a microphone in the handset, a third spoken utterance set forth by the first person, wherein the third spoken utterance includes a name of the second person;
   transmitting a third voice signal that encodes the third spoken utterance to the server computing device upon receiving the third spoken utterance, wherein the server computing device generates a transcription of the name of the second person based upon the third voice signal;
   receiving the transcription of the name of the second person from the server computing device; and
   based upon the transcription of the name of the second person, initiating the real-time communication session with the second computing system.

8. A method performed by a computing system that is operated by a first person, wherein the computing system includes a microphone, the method comprising:
   receiving, by way of a network connection between the computing system and a second computing system operated by a second person, a voice signal that encodes a spoken utterance emitted by the second person, wherein the spoken utterance is a portion of a real-time communication session between the first person and the second person;
   immediately in response to receiving the voice signal, transmitting the voice signal to a server computing device, wherein the server computing device executes an automatic speech recognition (ASR) system, wherein the ASR system generates a transcription of the spoken utterance upon receipt of the voice signal;
   in response to receiving the voice signal, buffering the voice signal in the memory of the computing system;
   receiving, from the server computing device, the transcription;
   immediately upon receiving the transcription from the server computing device:
      directing the buffered voice signal to a speaker such that the speaker audibly outputs the spoken utterance to the first person; and
      causing the transcription to be presented on a display such that the spoken utterance is presented on the display to the first person simultaneously with the speaker audibly outputting the spoken utterance to the first person or prior to the speaker audibly outputting the spoken utterance to the first person; and causing a second voice signal to be transmitted to the second computing system, wherein the second voice signal is based upon a second spoken utterance set forth by the first person, wherein the second spoken utterance is captured by the microphone, wherein the computing system fails to transmit the second voice signal to the server computing device.

9. The method of claim 8, wherein the spoken utterance is presented on the display to the first person prior to the speaker audibly outputting the spoken utterance, the method further comprising highlighting the spoken utterance on the display as the speaker audibly outputs the spoken utterance to the first person.

10. The method of claim 8, wherein the computing system is a telephone system, wherein the telephone system comprises a handset that includes the speaker, and further wherein the telephone system comprises the display.

11. The method of claim 8, further comprising:
determining an identity of the second person based upon an identifier for the second person received by the computing system; and
displaying graphical data that identifies the second person on the display concurrently with the spoken utterance, wherein the graphical data is at least one of an image of the second person or a name of the second person.

12. The method of claim 8, further comprising:
detecting that the real-time communication session has ended;
capturing, by way of the microphone, a third voice signal, wherein the third voice signal represents a third spoken utterance output by a third person in an environment of the computing system;
immediately upon capturing the third voice signal, transmitting the third voice signal to the server computing device, wherein the ASR system generates a second transcription of the third spoken utterance upon receipt of the third voice signal;
receiving, from the server computing device, the second transcription; and
immediately upon receiving the second transcription from the server computing device, causing the second transcription to be presented on the display to the first person.

13. The method of claim 12, wherein the third transcription is presented on the display in 24 point font.

14. The method of claim 8, the acts further comprising:
prior to receiving the voice signal, receiving an indication that the first person has picked up a handset that is operably coupled to the computing system;
receiving, by way of a microphone in the handset, a third spoken utterance set forth by the first person, wherein the third spoken utterance includes a name of the second person;
transmitting a third voice signal that encodes the third spoken utterance to the server computing device upon receiving the third spoken utterance, wherein the server computing device generates a transcription of the name of the second person based upon the third spoken utterance;
receiving the transcription of the name of the second person from the server computing device; and
based upon the transcription of the name of the second person, initiating the real-time communication session with the second computing system.

15. A computer-readable storage medium comprising instructions that, when executed by a processor, cause the processor to perform acts comprising:
receiving, by way of a network connection between a computing system operated by a first person and a second computing system operated by a second person, a voice signal that includes a spoken utterance emitted by the second person, wherein the spoken utterance is a portion of a real-time communication session between the first person and the second person;
immediately in response to receiving the voice signal, transmitting the voice signal to a server computing device, wherein the server computing device executes an automatic speech recognition (ASR) system, wherein the ASR system generates a transcription of the spoken utterance upon receipt of the voice signal;
in response to receiving the voice signal, buffering the voice signal in the memory of the computing system;
receiving, from the server computing device, the transcription;
immediately upon receiving the transcription from the server computing device:
directing the buffered voice signal to a speaker such that the speaker audibly outputs the spoken utterance to the first person; and
causing the transcription to be presented on a display such that the spoken utterance is presented on the display to the first person simultaneously with the speaker audibly outputting the spoken utterance to the first person or prior to the speaker audibly outputting the spoken utterance to the first person; and
causing a second voice signal to be transmitted to the second computing system, wherein the second voice signal is based upon a second spoken utterance set forth by the first person, wherein the second spoken utterance is captured by a microphone in communication with the processor, and further wherein the computing system fails to transmit the second voice signal to the server computing device.

16. The computer-readable storage medium of claim 15, wherein the spoken utterance is presented on the display to the first person prior to the speaker audibly outputting the spoken utterance, the acts further comprising highlighting the spoken utterance on the display as the speaker audibly outputs the spoken utterance to the first person.

17. The computer-readable storage medium of claim 15 comprised by a telephone system, wherein the telephone system comprises a handset that includes the speaker, and further wherein the telephone system comprises the display.

18. The computer-readable storage medium of claim 15, the acts further comprising:
determining an identity of the second person based upon an identifier for the second person received by the computing system; and
displaying graphical data that identifies the second person on the display concurrently with the spoken utterance, wherein the graphical data is at least one of an image of the second person or a name of the second person.

19. The computer-readable storage medium of claim 15, wherein the transcription is presented in a font that is between 16 point and 24 point, inclusive.

20. The computer-readable storage medium of claim 15, the acts further comprising:
receiving an indication that the real-time communication session has ended;

responsive to receiving the indication, capturing a third voice signal by way of a second microphone that is operably coupled to the processor, the third voice signal includes a third spoken utterance audibly emitted by a third person who is in an environment of the computing system;

transmitting the third voice signal to the server computing device;

receiving a transcription of the third spoken utterance from the server computing device; and displaying the transcription of the third spoken utterance on the display immediately upon receipt of the transcription of the third spoken utterance from the server computing device.

\* \* \* \* \*